United States Patent
Lambert

(10) Patent No.: US 10,746,600 B2
(45) Date of Patent: Aug. 18, 2020

(54) DUAL WAVELENGTH CONTEXT IMAGING RAMAN AND FLUORESCENCE SPECTROMETER

(71) Applicant: CALIFORNIA INSTITUTE OF TECHNOLOGY, Pasadena, CA (US)

(72) Inventor: James L. Lambert, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 243 days.

(21) Appl. No.: 15/983,019

(22) Filed: May 17, 2018

(65) Prior Publication Data

US 2018/0328786 A1 Nov. 15, 2018

Related U.S. Application Data

(63) Continuation-in-part of application No. 14/989,749, filed on Jan. 6, 2016, now Pat. No. 10,048,130.

(60) Provisional application No. 62/101,457, filed on Jan. 9, 2015.

(51) Int. Cl.
| | | |
|---|---|---|
| *G01J 3/44* | (2006.01) | |
| *G01J 3/28* | (2006.01) | |
| *G01J 3/02* | (2006.01) | |
| *G01J 3/10* | (2006.01) | |
| *G01J 3/18* | (2006.01) | |

(52) U.S. Cl.
CPC ............. *G01J 3/44* (2013.01); *G01J 3/0208* (2013.01); *G01J 3/0224* (2013.01); *G01J 3/0227* (2013.01); *G01J 3/0237* (2013.01); *G01J 3/0248* (2013.01); *G01J 3/10* (2013.01); *G01J 3/18* (2013.01); *G01J 3/28* (2013.01); *G01J 3/2823* (2013.01); *G01J 3/4406* (2013.01); *G01J 2003/102* (2013.01)

(58) Field of Classification Search
CPC ......................................................... G01J 3/44
USPC ....................................................... 356/301
See application file for complete search history.

(56) References Cited

U.S. PATENT DOCUMENTS

| | | | | |
|---|---|---|---|---|
| 5,164,947 A | * | 11/1992 | Lukas | H01S 3/042 372/21 |
| 6,146,553 A | * | 11/2000 | Wu | C01B 35/10 252/584 |
| 10,048,130 B2 | | 8/2018 | Lambert | |
| 2003/0058440 A1 | * | 3/2003 | Scott | G01J 3/10 356/318 |

(Continued)

OTHER PUBLICATIONS

Cooney, T. F., H. T. Skinner, and S. M. Angel, "Comparative study of some fiber-optic remote Raman probe designs, part 1: Models for liquids and transparent solids", Appl. Spectrosc., 50, No. 7, 836-848, 1996.

(Continued)

*Primary Examiner* — Tarifur R Chowdhury
*Assistant Examiner* — Omar H Nixon
(74) *Attorney, Agent, or Firm* — Steinfl + Bruno, LLP

(57) ABSTRACT

Methods and systems for Raman spectroscopy and context imaging are disclosed. One or two lasers can be used to excite Raman scattering in a sample, while a plurality of LEDs can illuminate the sample at a different wavelength. The LED light is collected by a lenslet array in order to enable a high depth of field. Focusing of the image can be carried out at specific points of the image by processing the light collected by the lenslet array.

20 Claims, 13 Drawing Sheets

(56) References Cited

U.S. PATENT DOCUMENTS

| | | | | |
|---|---|---|---|---|
| 2005/0030533 | A1* | 2/2005 | Treado | G01J 3/02 356/326 |
| 2009/0041068 | A1* | 2/2009 | Georges | H01S 3/0627 372/22 |
| 2010/0213376 | A1* | 8/2010 | Gardner, Jr. | G01J 3/02 250/339.07 |
| 2013/0182247 | A1* | 7/2013 | Volodin | G01J 3/10 356/301 |
| 2013/0293882 | A1* | 11/2013 | Dottery | G01J 3/44 356/301 |
| 2014/0247448 | A1* | 9/2014 | Wise | G01J 3/44 356/301 |
| 2015/0219906 | A1* | 8/2015 | Maiwald | G02B 27/141 359/566 |
| 2016/0202124 | A1 | 7/2016 | Lambert | |

OTHER PUBLICATIONS

McCain et al., "Multi-excitation Raman spectroscopy technique for fluorescence rejection," Opt. Express, vol. 16, No. 15, pp. 10975-10991, 2008.

McSween, H. Y., Jr., and E. Jarosewich, "Petrogenesis of the Elephant Moraine A79001 meteorite: Multiple magma pulses on the shergottite parent body", Geochim. et Cosmochim. Acta, 47, 1501-1513, 1983.

Wang, A., L. A. Haskin, and B. L. Jolliff, "Characterization of mineral products of oxidation and hydration by laser Raman spectroscopy: Implications for in situ petrologic investigation on the surface of Mars", Lunar Planet. Sci., XXVIII, Abstract 1819, (1998), 2 pages.

Y. Ma, L. Wu, H. Wu, W. Chen, Y. Wang, and S. Gu, "Single longitudinal mode Nd:YVO4 microchip laser with orthogonal polarization bidirectional travelling waves mode", Opt. Express 16, No. 23, 18702-18713 (2008).

Guyot, F., H. Boyer, M. Madon, B. Velde, and J. P. Poirier, Comparison of the Raman microprobe spectra of (Mg, Fe)2SiO4 and Mg2GeO4 with olivine and spinel structures, Phys. Chem. Miner., 13, 91-95, 1986.

Kawata, S., Nakamura, O., Minami, S. 1987. Optical microscope tomography. I. Support constraint, J. Opt. Soc. Am. A, vol. 4, No. 1, 292-297.

Levoy, M., Chen, B., Vaish, V., Horowitz, M., McDowall, I., Bolas, M. 2004. Synthetic aperture confocal imaging, Proc. Sig-Graph 2004.

Levoy, M., Hanrahan, P. 1996. Light Field Rendering, Proc. Sig-Graph 1996. pp. 31-42.

* cited by examiner

DUAL WAVELENGTH CONTEXT IMAGING RAMAN AND FLUORESCENCE SPECTROMETER

CROSS REFERENCE TO RELATED APPLICATIONS

The present application is a continuation-in-part of U.S. patent application Ser. No. 14/989,749, filed on Jan. 6, 2016, which in turn claims priority to U.S. Provisional Patent Application No. 62/101,457, filed on Jan. 9, 2015, the disclosures of both being incorporated herein by reference in their entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to optical spectroscopy. More particularly, it relates to a context imaging Raman spectrometer.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
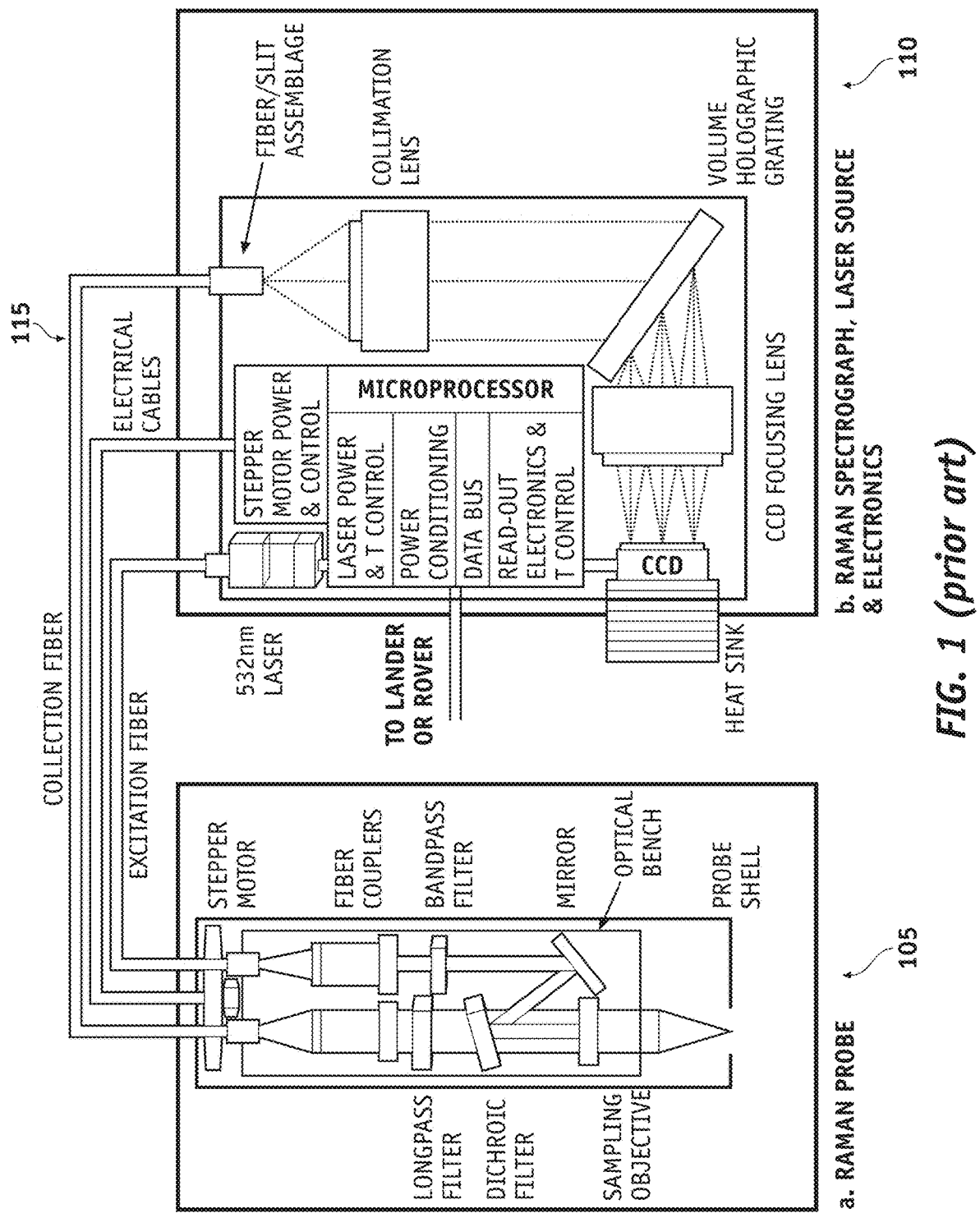
FIG. 1 illustrates an exemplary portable Raman instrument.

In a first aspect of the disclosure, a device is described, the device comprising: a first laser to emit a first laser light at a first wavelength; a plurality of LEDs to emit LED light at a second wavelength different from the first wavelength; a second laser to emit a second laser light at a third wavelength different from the first and second wavelengths; a plurality of optical elements to: convey the first laser light from the first laser onto a sample, convey the second laser light from the second laser onto the sample, and collect a Raman shifted light and the LED light from the sample; a Raman detector to collect the Raman shifted light; and a context imager detector to collect the LED light.

In a second aspect of the disclosure, a method is described, the method comprising: emitting a first laser light at a first wavelength by a first laser; emitting LED light at a second wavelength different from the first wavelength by a plurality of LEDs; emitting, by a second laser, a second laser light at a third wavelength different from the first and second wavelengths; by a plurality of optical elements, conveying the first laser light from the first laser and the second laser light from the second laser onto a sample, and collecting a Raman shifted light and the LED light from the sample; detecting the Raman shifted light by a Raman detector; and detecting the LED light by a context imager detector.

DETAILED DESCRIPTION

Raman spectroscopy is a powerful tool for mineral characterization and for detection of water and organic and inorganic forms of carbon. For example, the Mars microbeam Raman spectrometer (MMRS) is designed for close-up analysis of rocks and soils in planetary surface exploration, as described by Wang et al., Development of the Mars microbeam Raman spectrometer (MMRS), J.1 of Geoph. Research, vol. 108, no. E1, 5005, 2003, the disclosure of which is incorporated herein by reference in its entirety. The MMRS consists of a probe (in a flight unit to be deployed by a robotic arm) and a spectrograph, laser source, and electronics (in a flight unit to reside on a rover or lander). The Raman probe has a scanning optical bench that enables a 1-cm linear traverse across a target rock or soil, both on target materials as encountered and on fresh surfaces of rocks exposed by abrasion or coring. From these spectra, it is possible to identify major, minor, and trace minerals, obtain their approximate relative proportions, and determine chemical features (e.g., Mg/Fe ratio) and rock textural features (e.g., mineral clusters, amygdular fill, and veins). It is also possible to detect and identify organic species, graphitic carbon, and water-bearing phases. Extensive performance tests have been done on a brassboard model of the MMRS using a variety of geological materials (minerals, rocks, Martian meteorites, etc.). These tests show that a Raman spectrometer can be built that is suitably miniaturized, sufficiently robust, and low enough in power usage to serve as an on-surface planetary instrument, yet the spectrometer can retain high detection sensitivity and yield near laboratory quality spectra over a broad wavelength range. These features are essential to provide definitive mineralogy in a planetary exploration.

In other embodiments, the Raman spectrometer described in the present disclosure may have different applications, such as medical imaging or mineral analysis of rocks. The Mars spectrometer is used herein as an example, and other applications are within the scopes of the present disclosure. In some embodiments, a Raman spectrometer can enable direct information about chemical bonding and crystal structure, and thus enable direct identification of oxyanionic minerals, oxide and sulfide minerals (FeOOH, $Fe_2O_3$, $Fe_3O_4$, FeS, $FeS_2$, $TiO_2$, etc.), water and waterbearing minerals (ice, $CaSO_4$ $2H_2O$, micas, clay minerals, clathrates, etc.) and organic and inorganic carbon. A Raman spectrometer can provide information on rock texture, and it can determine cation ratios in many minerals.

In some embodiments, Raman spectroscopy includes scanning across the target surface with a microbeam, which enables statistical estimates of relative abundance for major minerals and detection of minor and trace minerals. For example, a Raman microanalytical instrument, the Mars microbeam Raman spectrometer (MMRS), can be simple, robust, low mass, small volume, conservative of power, and able to work in the harsh environments encountered by flight instruments. The instrument has the sensitivity and spectral range and quality that approach those of a modern laboratory Raman instrument. It can scan unmodified surfaces of rocks and soils as encountered, without sample preparation, as well as examine abraded rock surfaces and cores.

An on-surface Raman system should cover a broad spectral region and have adequate spectral resolution and detection sensitivity. For example, a range of 200-1800 $cm^{-1}$ for characterization of minerals and graphitic carbon, and 2500-4000 $cm^{-1}$ for detection of organic functional groups and water. In some embodiments, a spectral resolution of 7 $cm^{-1}$ can give a wave number precision of less than 2 $cm^{-1}$ for peak positions. In some embodiments, the probe delivers 10 mW of laser power to the target. To achieve a high tolerance of the relief intrinsic to unprepared, rough sample surfaces (rock or soils) without an autofocus mechanism, the probe has a large depth-of-sampling field. To obtain a line of 100 spectra along a 1.2-cm traverse of the target surface, the probe uses a simple line-scan mechanism. Combining a microbeam with a line-scanning traverse capability increases the probability of finding minor minerals and weak Raman scattering phases because the spectrum obtained at most spots will be of only one or two minerals. The overall result of such a line scan is thus the identification of major minerals, minor minerals, and determination of rock texture, rough mineral proportions, and mineral chemistry. In other embodiments, different technical specifications may be used to realize the Raman spectrometer.

In Raman spectroscopy, monochromatic light from a source is scattered inelastically from the target material, for example, a mineral. The spectrometer rejects reflected light from the source and Rayleigh-scattered light of that same wavelength, and it analyzes the longer wavelengths of the Raman-scattered light (Stokes lines). The difference in wavelength between the source light and the scattered light corresponds to transition energies in the material that produced the scattering. This difference in wavelength, normally given in units of wave number, $cm^{-1}$, is called the "Raman shift." For example, inelastic scattering from the silicate mineral olivine gives Raman-scattered light of several principal wavelengths, and those wavelengths are characteristic of olivine. The transitions that give rise to these main peaks are Si—O vibrational motions, transitions whose energies correspond to those of mid-infrared and far-infrared photons. For many minerals, a plethora of minor peaks is also produced. A technological advantage of Raman spectroscopy is that it provides information similar to that obtained by mid-infrared and far-infrared spectroscopy, but the spectra can be obtained in the visible spectral region where Raman spectroscopy is efficient. Also, lasers and detection systems in the visible region of the spectrum are well understood and have space flight heritage because most optical and electro-optical components have their best performances there and have a long history of successful fabrication.

Because the Raman effect is weak compared to other signal sources, a laser excitation source is required for practical use. Shorter excitation wavelengths can be the most effective for a given laser power because of the inverse dependence of Raman scattering intensity on the fourth power of the wavelength. For mineralogical work, relative freedom from photoluminescent interference in the fundamental vibrational regions of oxyanionic minerals, oxide and sulfide minerals, and $H_2O$ and OH can be important. Therefore, in some embodiments, a 532 nm (green) laser is very suitable for Raman spectroscopy according to the present disclosure. However, other wavelengths may be used. For example, blue or red wavelengths. Small, mechanically robust, relatively power-efficient lasers at the green wavelengths are available, such as diode pumped, frequency-doubled $YVO_4$/Nd+KTP devices.

In some embodiments, as visible in FIG. 1, the devices of the present disclosure can comprise a Raman probe (105) and a spectrometer (110). The probe (105) may comprise different elements such as optical filters and lenses. The probe and the spectrometer may be connected with multiple optic fibers (115). A fiber may be used for the excitation laser, while another fiber may be used for collecting the resulting signal. For example, a lens focuses the laser beam onto the sample and collects the backscattered radiation from the sample, which includes reflected laser light, Rayleigh-scattered light, and Raman-scattered light at a shifted wavelength. The probe filters out the reflected and Rayleigh-scattered radiation and directs the Raman signal to a second optical fiber that leads to the spectrograph.

In some embodiments, the objective lens focuses the laser light which can be advantageous. A coaxial light path of excitation and collection can ensure maximum cone overlap and thus maximum collecting efficiency of the Raman-scattered light. In some embodiments, the same objective lens can be used to condense the laser beam onto the sample and to collect the scattered Raman radiation from the sample.

In some embodiments, a multimode optical fiber can be used instead of a single-mode optical fiber for transfer of the excitation laser beam to the probe. A multimode optical fiber can improve system robustness against mechanical vibration and have a higher coupling efficiency of the excitation laser power.

In some embodiments, the Raman probe is deployed with a mechanical arm of a rover. For example, the arm can press the probe against the target, thus fixing the average distance between the sampling (and condensing) objective and the target. For simplicity and ruggedness, in these embodiments, no automatic focusing is used. Instead, the probe has an effective depth-of-sampling field of several millimeters to accommodate the surface roughness anticipated for most samples. This is achieved by using a sampling objective with a long working distance (1 cm) and a low numerical aperture (NA=0.45). A multimode optical fiber (d=200 mm) can be used to collect the Raman signal from the probe and to transfer it to the spectrograph. This fiber acts like an oversized iris at the back-imaging plane of the sampling objective, making it possible to collect Raman signal from off-focus planes of the sample. This configuration gives an effective depth-of-sampling field that considerably exceeds the depth of focus of the objective as normally considered. This large effective depth-of-sampling field is an advantage in Raman measurements on the uneven sampling surfaces of rocks.

In some embodiments, a rock is analyzed by taking a spectrum at different points of the rock surface, by moving the probe in a series of steps. In this way, a spectrum is taken at each step. The condensed laser beam activates only a small volume of the target, which usually contains only one or two mineral grains, so only their spectra are recorded. One of those grains may be a minor or trace mineral in the rock or soil, but it provides a major part of the Raman signal at that sampling point. This procedure increases the probability of detecting minor and trace minerals as well as weak Raman scattering minerals, whose signals would be lost in the background noise of the minor peaks of strong Raman scattering minerals if they were simultaneously excited by a broad excitation laser beam. Peak positions are key for mineral identification; peak intensities are normally not used for that purpose.

In some embodiments, the Raman spectroscopy device of the present disclosure may comprise dielectric band-pass, dichroic, and long-pass edge filters in the optical train of the probe. These filters have low coefficients of thermal expansion. Raman signal is produced within the optical fiber that transmits the laser beam to the probe. This Raman signal extends to >1000 $cm^{-1}$ and has a maximum near 430 $cm^{-1}$. The band-pass filter attenuates this signal, for example, by a factor of $10^{-5}$ (OD>5) at a Raman shift position of 105 $cm^{-1}$. The filter has a greater than 80% transmittance at the excitation laser wavelength (532 nm), so it does not significantly decrease the laser power to the sample. The dichroic filter can serve as a front-surface mirror to direct the laser beam toward the sampling objective. This same filter, when acting in transmissive mode has an OD>4.5 at the excitation wavelength (for example, at 532 nm) to reject much of the component of the backscattered radiation (Rayleigh-scattered or reflected laser radiation) and a transmittance of 93±4% starting from 543 nm (Raman shift of 380 $cm^{-1}$). This provides efficient transfer of the Raman signal from the sample. A long-pass edge filter provides additional rejection of 10 with an OD level of 4.5 at 532 nm, and an even higher transmittance (95±4%) for Raman signals. Overall, an exemplary probe can reach 41% effective transmission for the 532 nm excitation beam, and 64% for on-focus Raman signal collected at a Raman shift of 3000 $cm^{-1}$ (633 nm).

In some embodiments, the radiation resulting from the laser excitation is collimated, dispersed, and imaged onto a CCD detector (Charge Coupled Device). For example, the MMRS spectrograph has an axially transmissive optical train, as visible in FIG. 1. In some embodiments, the axially transmissive optical train comprises a volume holographic transmissive grating that is matched by two sets of on-axis lenses for high-quality imaging. An advantage of a totally transmissive optical train in a flight spectrograph is its lower sensitivity to the unavoidable misalignments in a miniaturized instrument and to mechanical vibrations that may occur during rover mobility operations. The angular displacement of a ray caused by a misalignment or a mechanical vibration passing along a transmissive optical path is only half as large as it would be on passing along a reflective optical path.

Additionally, from the point of view of optical design, a transmissive, on-axis optical train has intrinsically low aberration. By using multicomponent lenses for collimating and focusing, almost complete correction of the major aberrations (spherical aberration, coma, and astigmatism) can be reached over a large wavelength range. This allows low f number optics with a large solid angle of acceptance to be used. The low f number optics also enable a high throughput for Raman photons. The low aberration results in high imaging quality and high spectral resolution. For an axially transmissive spectrograph, it is easy to approach diffraction limited imaging, so that spectral resolution may be limited mainly by the width of pixels rather than by the point spread function of the optics. In addition, the low level of scattering by a volume holographic grating results in a lower level of stray light than is normally achieved using reflective components. For example, a volume holographic grating used has groove densities of 2455 lines/mm (lower Raman shift region) and 2156 lines/mm (higher region) to provide high angular dispersion. Lenses with very short focal lengths can therefore be used to attain high spectral resolution, thus allowing the spectrograph to remain compact in size.

In several embodiments, a dispersive spectrograph involves a trade-off between spectral coverage and spectral resolution to match a detector of fixed length. A transmissive, dual-blaze grating can simultaneously disperse two separate spectral regions onto one CCD frame. Each spectral region can make full use of the 1088 channels (20 pixels high) of the CCD detector. In this way, the spectrograph covers the spectral ranges (200-1800 and 2500-4000 $cm^{-1}$) required to achieve the detection of a wide variety of minerals and organic substances, yet with adequate spectral resolution to determine cation ratios of geologically important phases (e.g., pyroxenes, olivine, carbonates, and sulfates). With this dual-blaze grating, it is possible to achieve a spectrograph of low mass and volume with wide spectral coverage and high spectral resolution.

In most high-performance laboratory Raman instruments, a fiber-slit assemblage is used. Raman radiation transported via an optical fiber can be either directly coupled to or imaged onto the slit to form a rectangular image of the collected Raman radiation. This image is registered on the CCD, and its width determines the spectral resolution. The throughput of such an assemblage depends on the core diameter of the optical fiber relative to the slit width, that width being established by the required spectral resolution. To achieve a desired spectral resolution, it may be required to have a 50 mm input aperture to the spectrograph. In some embodiments, the collecting fiber of the present disclosure is 200 mm in diameter, in which case nearly 70% of the Raman signal is sacrificed in order to preserve resolution by using a 50 mm slit.

In some embodiments, such as in the MMRS brassboard, a three-element lens collimates the Raman beam received from the fiber-slit assemblage, and a four-element lens condenses the dispersed spectral images onto the CCD detector. This pair of multicomponent lenses is aberration-corrected and provides a 1:1 image of the slit onto the detector, which achieves the necessary spectral resolution.

In some embodiments operating in the visible spectral region, a silicon-based CCD camera can be used as the detector. For example, a frame transfer, 1088×1088-pixel CCD chip with a pixel size of 12×12 mm can be used as the detector. An attractive feature of this CCD is its low dark current at relatively high temperatures (typically below 50 $pA/cm^2$ at 25° C.).

In some embodiments, Raman point counting is the procedure used to study rocks. In this procedure, a number of sequential Raman spectra (e.g. 100) is taken along a linear traverse on the surface of a rock. Each Raman spectrum obtained will contain the peaks of the minerals excited by the excitation laser beam. Mineral proportions can be estimated from the frequency of appearance of the Raman spectrum of each mineral in the set of spectra. For example, if plagioclase is observed at 40 out of 100 points, then the rock contains <40% plagioclase (in some cases, more than one mineral will fall within the excitation volume). To a first approximation, it is possible to claim 40±6% plagioclase. Such an estimate is usually adequate for rock classification, for which both mineral proportions and mineral grain size are needed. Grain size is inferred to be large if a sequence of points in a scan give spectra of the same mineral and the cation ratio is constant or varies monotonically across the sequence. The proportion of a trace phase cannot be well determined from a 100-point scan; the trace phase can show up more often or less often than its actual proportion in the rock, or it can be missed all together. The frequency with which a trace phase is observed depends on its Raman scattering cross section and on its proportion in the rock or soil, its grain size, and the uniformity of its dispersion. In addition, cation ratios of olivine, pyroxene, and some oxide minerals can be obtained from the spectra, and these provide further information about the origin and alteration of the rocks.

Obtaining this information by Raman point counting requires that a high fraction of the spectra from a point counting traverse have detectable Raman peaks. In some cases, spectra without detectable peaks occur for two general reasons. In one case, the Raman scatterers yield such a low level of counts that no spectral peak rises above the spectral background noise. This situation most often occurs when the focal plane of the laser beam is offset by several millimeters from the sample surface or when the sample is very dark and there is strong absorption of the laser beam. This problem can often be remedied by increasing the integration time to minutes. In the other case, the spectrum has such a high background that the noise masks the Raman peaks. This usually occurs because the laser has excited a highly fluorescent substance. These spectra are not uninformative, however. Many organic residues encountered in rocks or soils yield high fluorescence, which means that fluorescence is an indicator that such material might be present. Some mineral phases are also fluorescent, and some of these minerals have narrow fluorescent spectral lines that are diagnostic of the particular element (especially the rare earth elements). Inorganic fluorescence from Mn and Fe are common and give broad peaks. The central location of such broadband fluorescent backgrounds, both organic and inorganic in origin, and seen mainly in some carbonates and feldspar, provides information about the origin and history of the host rock.

In most cases, it is more difficult to obtain good spectra from minerals in rocks than from separated, individual mineral grains. Surfaces of rocks are rough, sizes of mineral grains may be small, the laser beam reflects from internal mineral boundaries as well as from the surface of the rocks, and fluorescent phases may be present. These factors all reduce the strength of the Raman signals or increase background.

As noted above in the present disclosure, the optical design of a Raman probe, in some embodiments, can provide a depth-of-sampling field of millimeters. In conjunction with that aspect of the optical design, a high overall level of system light throughput is needed because the Raman signals from off-focus measurements are weaker than those taken near the focus. This can be an issue for intrinsically weak Raman scatterers rather than for strong ones, and the maximum off-focus distance for detecting weak scatterers is thus shorter than that for strong scatterers. An important factor that affects the distance for off-focus detection of a mineral is the nature of the matrix in which it resides and the grain size of that matrix. Off-focus measurements sample a larger area than on-focus measurements, and in a fine-grained material, off-focus measurements can involve Raman signal from several grains rather than just one or two. Thus, if the target is far enough out of focus, only strong scatterers may be detected even when a weak scatterer is within the illuminated volume. If at a particular location a strong scatterer is observed to have a weaker peak intensity than is common at other locations on the target, the location from which that spectrum was obtained may be significantly off focus. Also, if the matrix has a high level of fluorescent emission, or if the matrix is a strong absorber of the excitation laser wavelength, the Raman emission from a particular mineral grain in the matrix could be missed when a large area of matrix gets sampled in an off-focus measurement.

In certain applications, such as for example geophysical application, the fluorescence cross section is greater than the Raman cross section. As known to the person skilled in the art, fluorescence is the radiation due to a shift in energy level of electrons due to the emission of energy previously absorbed by the excitation photons. Raman signals are irradiated as a relatively small shift in the excitation wavelength and the Raman energy of the signal is proportional to that projected by the excitation laser. Therefore, the signal from the shifted peaks may not be clearly visible, due to noise, when super-imposed with the fluorescence signal.

To obviate the difference in power between the Raman and fluorescence signals, a multimodal multiplex Raman spectrometer which uses multi-wavelength excitation can be used to better detect Raman signals in the presence of fluorescence by taking advantage of the shift-variance of the Raman signal with respect to excitation frequency, for example as described by McCain et al., Multimodal multiplex Raman spectroscopy optimized for in vivo chemometrics, Biom. Vibr. Spectr. III: Adv. In Research and Industry, Proc. of SPIE vol. 6093, 2006, the disclosure of which is incorporated herein by reference in its entirety. The signal collected from the multi-wavelength excitation can be processed to extract the Raman signal from the combined signal sources collected from the sample (comprising also the fluorescence signal). For example, statistical regression can be used. In some embodiments, partial least square regression or least square regression can be used. The shot noise due to fluorescence does not appear in the Raman signal, which is an advantage. As known to the person of ordinary skill in the art, the excitation wavelength used by McCain et al. could not be applicable to rocks, therefore a shorter wavelength must be used, such as green light wavelength as described herein. However, single mode laser sources are not common. Therefore, the present disclosure describes the use of a frequency doubling laser.

As known to the person of ordinary skill in the art, the second harmonic generation (also referred to as frequency doubling) is a nonlinear optical process, in which photons with the same frequency interacting with a nonlinear material can generate new photons with twice the frequency of the initial photons. For example, a birefringent crystal can be used. As known to the person of ordinary skill in the art, birefringence is the optical property of a material having a refractive index that depends on the polarization and propagation direction of light. These optically anisotropic materials are birefringent. A doubling crystal rotates the modes of the laser.

As described in the present disclosure, a multi-wavelength Raman spectroscopy setup is combined with a frequency doubling laser. This device enables statistical analysis of the collected signal, thus enabling the separation of the Raman signal from other signals such as the fluorescence signal. In some embodiments, a diode laser can be used coupled with a birefringent crystal that doubles the laser frequency to obtain green light. The green light is applied to the sample through a multi-wavelength Raman spectroscopy set up.

In some embodiments, the birefringent crystal is rotated in order to obtain a plurality of wavelengths to use in the multi-wavelength Raman spectroscopy set up. In this set up, the polarized light transmitted through the crystal rotates in a sinusoidal pattern. For example, a Lyot filter can be used. A Lyot filter is a type of optical filter that uses birefringence to produce a narrow passband of transmitted wavelengths. In some embodiments, the Lyot filter comprises one or more birefringent plates. The polarization state of light with a certain wavelength will be changed as it is transmitted through one of the plates, and this causes a loss of optical power as the light is transmitted through the next plate. For certain wavelengths, however, the optical path length difference is an integer multiple of the wavelength, so that the losses are very small. By rotating the plates, it is possible to shift the wavelengths of the transmission peaks.

In some embodiments, an electrically tunable liquid can be inserted between the birefringent plates to electrically control the Lyot filter. In other embodiments a change in temperature can be used, which can in turn change the sinusoidal modulation of the birefringent crystal filter, and therefore sweep the laser along multiple wavelengths. This effect is possible due to the temperature dependence of the refractive index of the crystal. For example, a heater can be placed on the birefringent crystal in order to control its temperature.

Therefore, in some embodiments, a frequency doubling laser (for example a green laser) is used in conjunction with a birefringent crystal (for example a Lyot filter), in order to obtain a plurality of wavelength that can be applied to a sample to enable a multi-wavelength analysis of the Raman signal.

Figure 5:
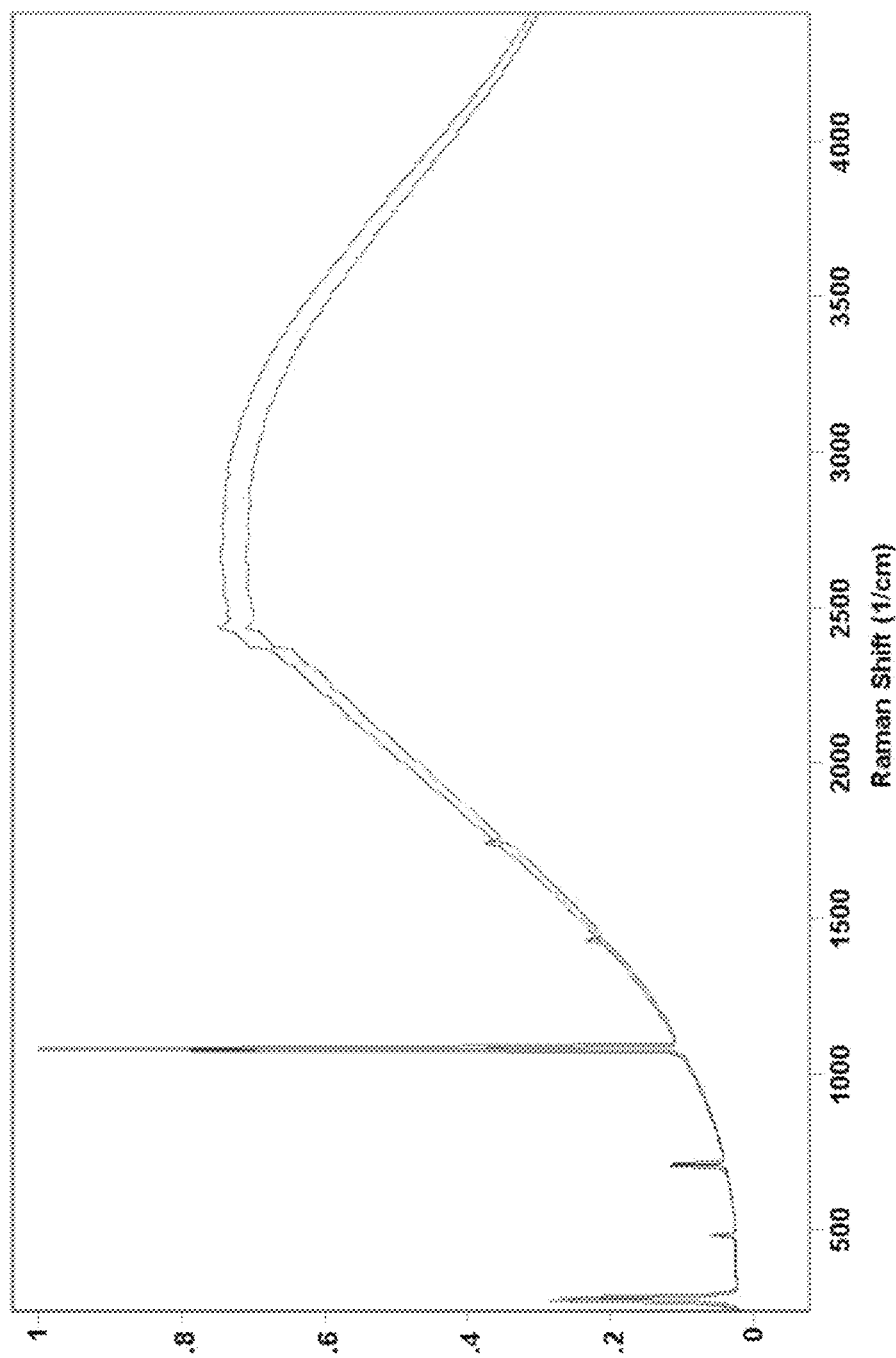
FIGS. 5-7 illustrate exemplary Raman measurements.
Figure 6:
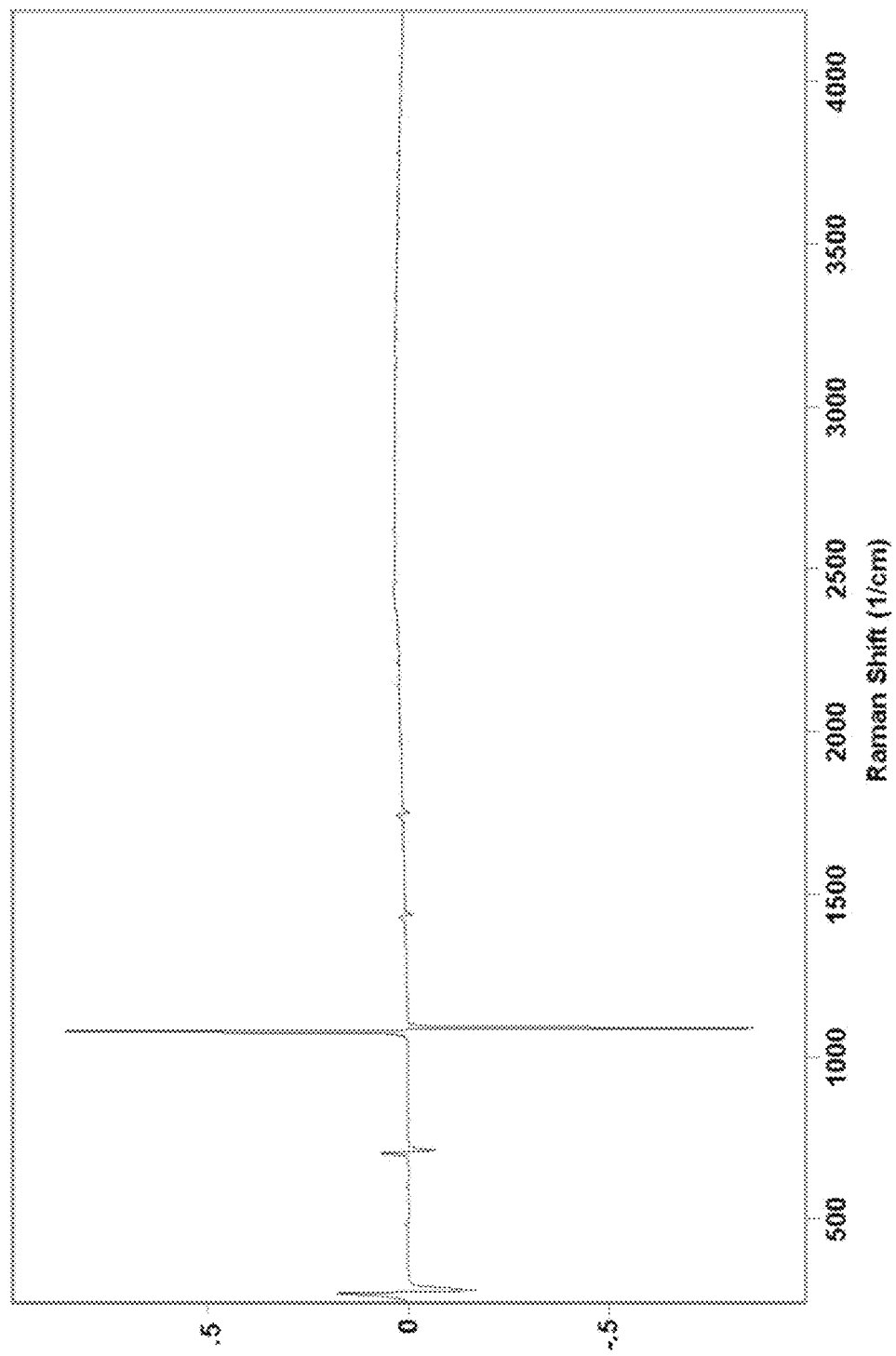
Figure 7:
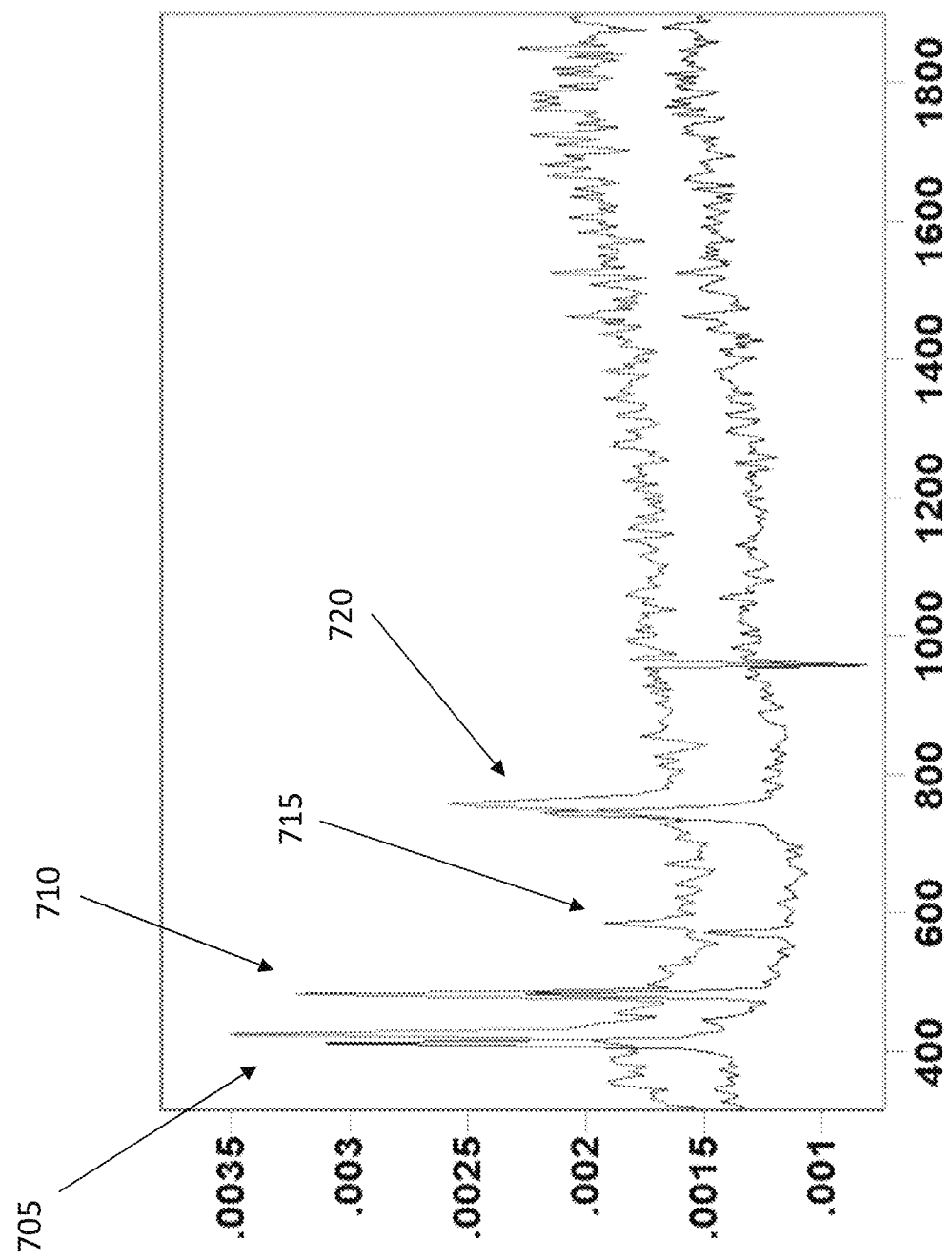

As discussed above, Raman spectroscopy allows the analysis and detection of different samples. However, fluorescence produced by elastic scattering and stray light can obscure the Raman signal. As known to the person of ordinary skill in the art, and as discussed by McCain et al. as cited above, shifted excitation Raman difference spectroscopy (SERDS) may be used to reduce interference from fluorescence and stray light by shifting the frequency of a laser light that is incident on a sample. The Raman bands are generally shifted in response to a shift in excitation frequency, while the broad background fluorescence and stray light are generally much less affected by the excitation frequency shift. Exemplary dual wavelength spectra captured with SERDS are illustrated in FIG. 5. The corresponding SERDS difference spectrum is illustrated in FIG. 6. FIG. 7 illustrates an example of how to distinguish between Raman and fluorescence signals using SERDS. The Raman peaks (705, 715, 720) are shifted for the two different excitation wavelengths, while the fluorescence peak (710) is not shifted.

Shifted excitation Raman difference spectroscopy generally involves a subtraction of two spectra obtained from two different excitation frequencies. The subtraction can result in a derivative spectrum that may reduce the background and fluorescence spectra thus allowing enhanced detection of the Raman signal. Shifted excitation Raman difference spectroscopy may not sufficiently reduce fluorescence and stray light in all environments. A spectral impulse response can be used to make a mathematical distinction between a non-Raman signal and the Raman signal. Both spectral components include sub-components that are linear and non-linear with respect to the exciting wavelengths. However, the linear components are generally stronger than the non-linear components. The linear terms are described by an impulse response. The non-Raman spectrum can be assumed to be constant for small shifts in excitation wavelength.

The distinguishing feature of the Raman and the non-Raman signals is that the Raman impulse response is typically shift invariant in the exciting field, while the non-Raman impulse response is not shift invariant. The term "shift invariant" means that the Raman impulse response is a function only of the difference between the observed frequency and the exciting frequency (McCain et al.).

McCain et al. uses the excitation spectrum of an array of lasers to shift the measured Raman spectra. These spectra can then be summed, and PLS-regression used to determine which portions of the signal correspond to the molecule of interest. By shifting the spectra, the Raman peaks will overlap and add, whereas any non-Raman signals will be distributed among many spectral channels thus making the estimation more robust against unknown interferents.

In the present disclosure, in some embodiments, instead of an array of lasers having different wavelengths, the same laser is used to produce different wavelengths. In some embodiments, a green frequency doubling laser is swept by modulating the birefringent crystal, thus producing a plurality of wavelengths.

For example, a single frequency, tuneable diode pumped Nd:YVO$_4$/YVO$_4$/KTP microchip laser operating at 532 nm can be used, as described by Sotor et al., Single-longitudinal mode Nd:YVO4/YVO4/KTP green solid state laser, Opto. Electron. Rev., 18, no. 1, 2010, the disclosure of which is incorporated herein by reference in its entirety. In some embodiments, the single frequency operation can be obtained with a birefringent filter, where an YVO$_4$ beam displacer acts as an ideal polarizer. This type of laser has a single frequency operation, and is tuneable over 0.6 nm in the spectral range around 1064 nm. The laser can operate with output power of 110 mW at 53 nm. The total optical efficiency (808 nm to 532 nm) can be 14%. Other types of single mode frequency doubling lasers may also be used.

Figure 2:
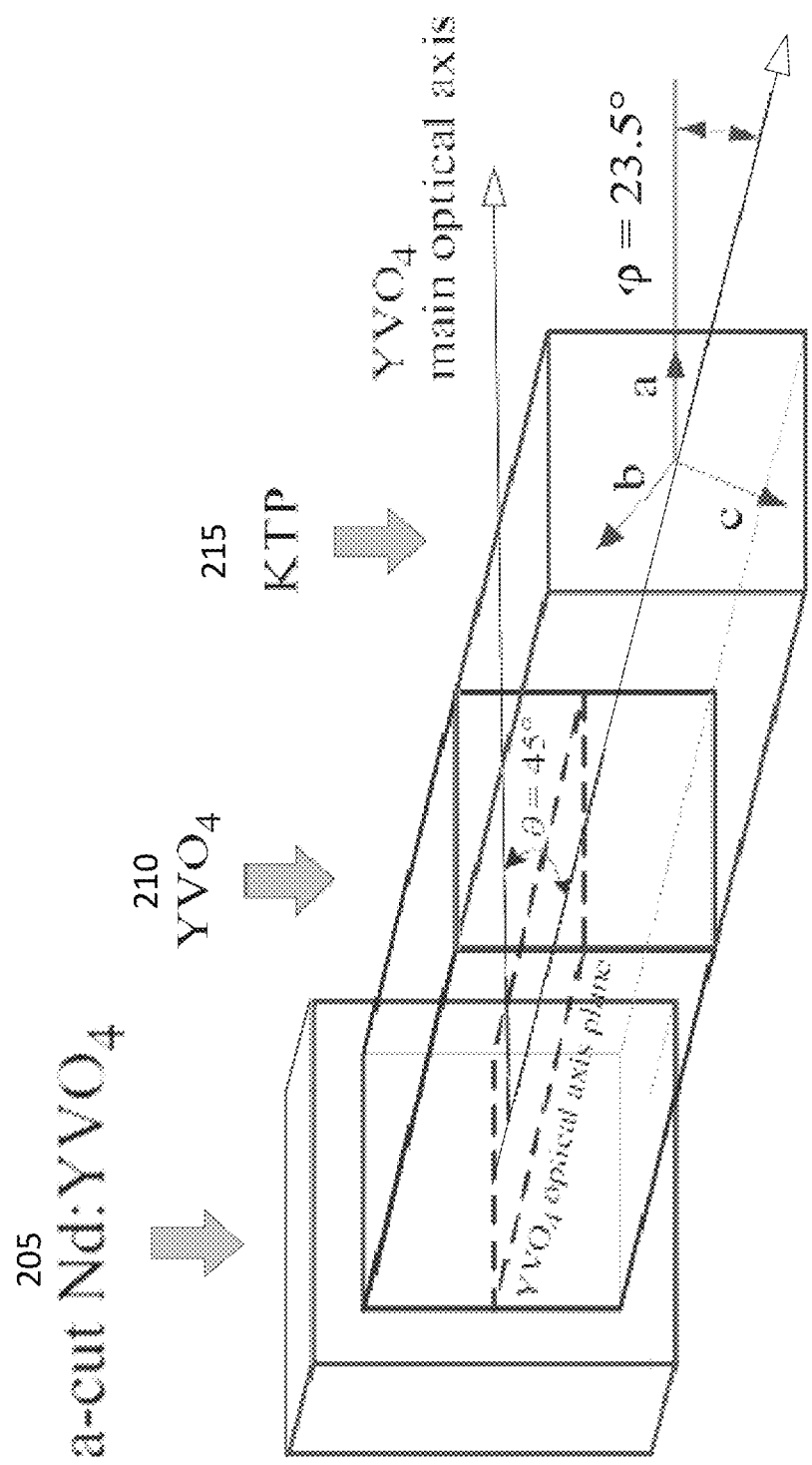
FIG. 2 illustrates an exemplary Nd:YVO4/YVO4/KTP laser.

An exemplary Nd:YVO$_4$/YVO$_4$/KTP laser is illustrated in FIG. 2, where the Nd:YVO$_4$ (205), YVO$_4$ (210), and KTP (215) components are illustrated. The exemplary laser comprises a Lyot filter that enables single mode operation. The Lyot filter can be modulated to sweep the wavelength and operate the multi-wavelength Raman spectroscopy set up.

In other embodiments, a dual laser setup may be used, for example with a green laser and a red laser. In some embodiments, both lasers may be modulated for producing multiple wavelengths, or the two lasers may be used in conjunction to enable Raman spectroscopy based on the difference of two Raman spectra taken at each wavelength of each laser. In some application this simpler technique may be useful, however it doubles the noise associated with the Raman signal, due to the difference operation.

Figure 3:
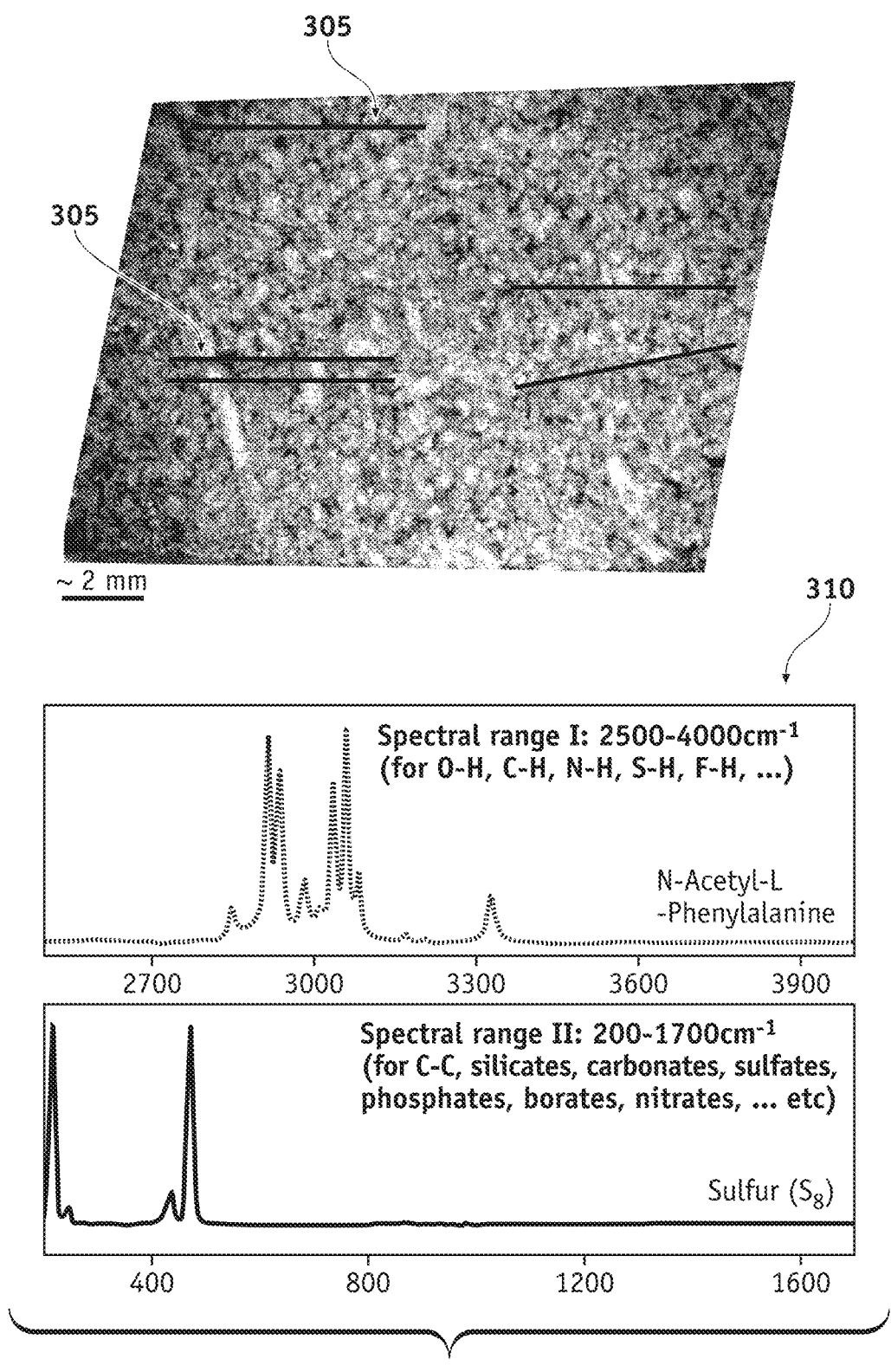
FIG. 3 depicts exemplary measurements in a line across a sample.

FIG. 3 illustrates an exemplary Raman spectrometer operation, with a line scanning method. A point counting methodology is illustrated, for characterizing rock samples using a dual-band multiplexed holographic transmission grating. Measurements are taken along a line (305). Exemplary results are plotted (310).

Figure 4:
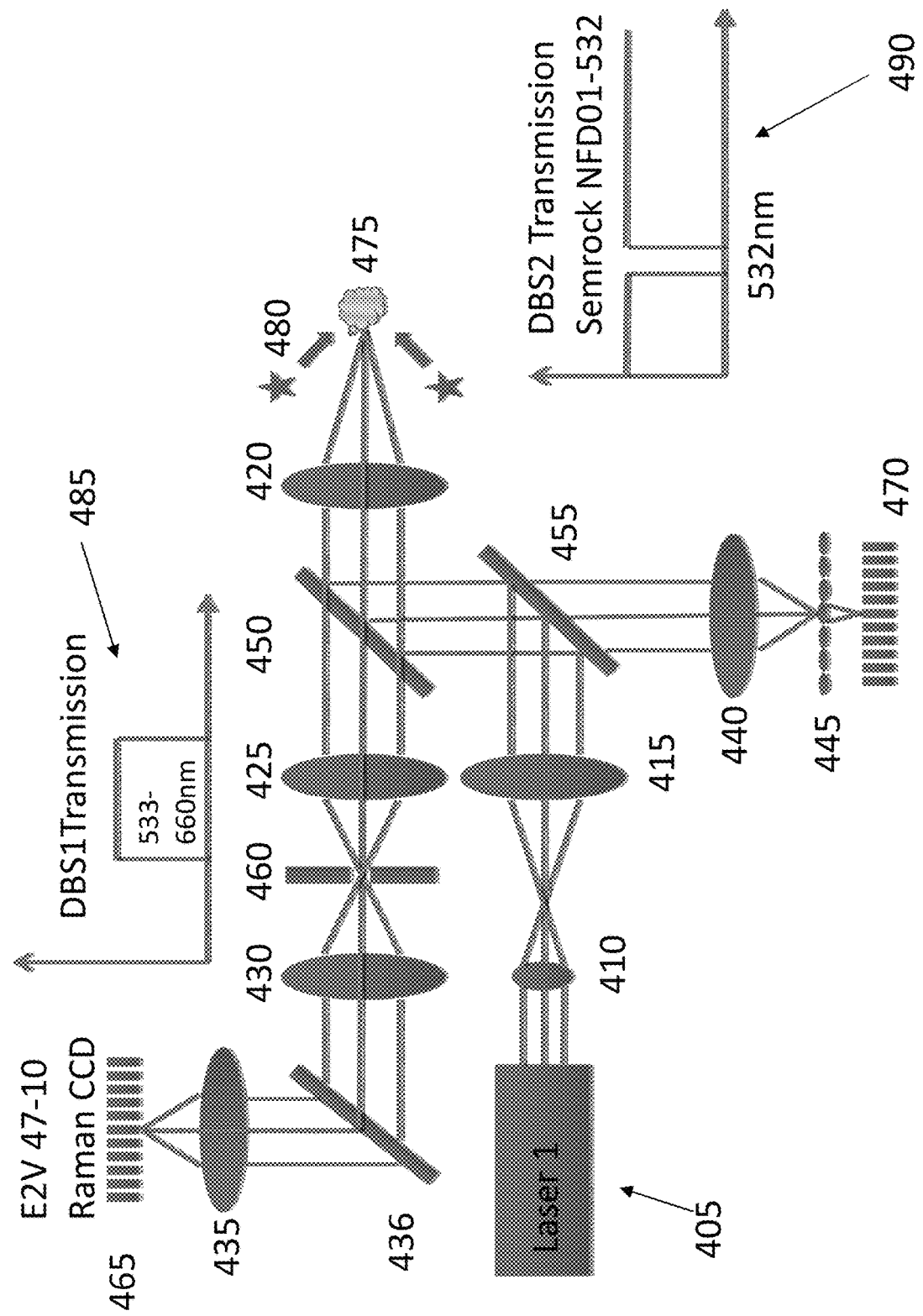
FIG. 4 illustrates an exemplary Raman and context imaging set up.

According to the present disclosure, FIG. 4 illustrates an exemplary optics set up for a Raman spectrometer with light field imaging. Light field imaging can provide, in some embodiments, a greater that 6× increase in depth of field with the same f number. The Raman microbeam spectrometer can operate without autofocus. Different embodiments may comprise changes in the optics set up, for example a lens may be a single lens or comprise a plurality of smaller lenses to accomplish a similar function.

In FIG. 4, a laser (405), such as a frequency doubling green laser, is the source of light. The laser beam is expanded through a first (410) and second (415) lenses. The expansion of the beam allows greater focusing onto the sample (475). The beam will be larger at the sample (475) if the beam exiting the laser (405) is less expanded by lenses (410) and (415). In other words, the bigger the beam is at lens 415), the smaller the beam will be at lens (420). The laser beam is reflected by a first dichroic beam splitter (DBS, 455). The transmission spectrum for the splitter (455) is illustrated in (490). A narrow band around the green laser wavelength of 532 nm is reflected by the splitter (455). The person of ordinary skill in the art will understand that if the wavelength of the laser is changed from 532 nm, the optics characteristics would be adjusted accordingly, for example by adjusting the reflection band in the splitter (455) according to the wavelength of the laser (405).

Continuing from splitter (455), the laser light is reflected again at the second dichroic beam splitter (450). The transmission spectrum for the splitter (450) is illustrated in (485). The spectrum (485) allows the reflection of the laser at 532 nm to impinge on sample (475), while allowing transmission of the shifted Raman signal originating from the sample (475). Lens (420) both focuses the laser beam on the sample, and collects the measured signal off the sample. The shifter Raman signal then is transmitted through splitter (450) and lens (425). Continuing from lens (425), a split (460) can be used, and then another lens (430), with the Raman signal continuing through a multiplexed holographic grating (436) to be focused by a lens (435) onto a CCD (465). The grating (436) and lens (435) can be adjusted in order to have a wavelength separation spatially separated onto the size of the CCD detector (465). The wavelengths can be spread out to adjust to the dimensions of the detector, so that sufficient resolution is achieved. In this way, not all wavelengths are concentrated onto the same pixel or spot in the detector, thereby increasing its resolution. The color dispersion is carried out through the grating (436). The spectral range is adjusted to the "length" of the detector. For example, the green light might be on one end of the detector, and the red light on the opposite end, with a graduation of wavelengths inbetween. A similar adjustment can be carried out for detector (470).

In some embodiments, an LED ring (480) can be present around the sample (475). The ring is made of LEDs that illuminate the sample. The wavelength of the LEDs light is different to that of the green excitation laser, for example with a shorter wavelength, such as 470 nm. The LED light collected from the sample through lens (420) is reflected by splitter (450), since it is at a shorter wavelength than its transmission band in (485). This LED light continues to splitter (455) to lens (440) which focuses the light onto a lenslet array (445) and then onto detector (470).

The lenslet array captures a light field image as described below. In some embodiments of the present disclosure, a plenoptics or light field camera can be used. As known to the person of ordinary skill in the art, a light field camera (or plenoptic camera) captures information about the intensity of light and also about the direction of the light. For example, a light field camera may use an array of microlenses placed in front of a conventional image sensor to sense intensity, wavelength, and directional information. Other light field cameras can comprise a multi-camera array. By using a light field camera to image a sample, it is possible to obtain an image that stores information to be used at a later time. For example, if at a later time it may be necessary to focus on a certain part of the image, the image captured with a light field camera can enable that.

In some embodiments, the light field camera can be combined with the Raman spectroscopy set up described above, in order to store the Raman signal of a sample and focus on different parts of the sample at a later time. An advantage of a light field camera combined with the multi-wavelength is the possibility of enabling Raman spectroscopy without moving parts. In this embodiment, the focus of the Raman spectroscopy image is on the whole sample, such as a rock. Multiple planes are captured through the use of software, enabling focusing on different parts of a sample, such as a rock, at a later time. In this way, data captured in the past can be analyzed again in future for purposes that were not determined at the time of capture. The data can thus be more useful in the long term.

In some embodiments, the Raman signal is captured with a center focus through detector (465), while the lenslet array captures the LED light through detector (470). The use of an array of lenslet allows the capture of an image with a greatly increased depth of field. Each lenslet of the array captures a portion of the total image. The images from each lenslet can be combined to obtain a total image of the sample. This total image can be focused on different portions of the sample by manipulation of the different image components captured by each lenslet.

For example, the image may be focused on the top right part of the sample, and at a subsequent time the image may be refocused on the bottom right part of the sample. This technique is possible thank to the depth of field captured by the lenslet array compared to the limited depth of field captured by a single lens. The single lens will necessarily limited to a certain depth of field, reduced compared to that captured by a lenslet array.

The array of lenslets can be customized to allow the implementation of different light fields. For example, in one type of light field, the lenslets have a diameter of about 30 micrometers, for example between 20 and 50 micrometers. This type of array may be susceptible to vignetting, but for most types of application, such as rock imaging, this downside is not too important. The advantage of this type of light field is the increased light capture efficiency, and increased depth of field, with an acceptable decrease in resolution.

A second type of light field employs lenslet of increased diameter, such as 250 micrometers, for example between 240 and 260 micrometers. This second type of light field has an increased resolution compared to the first type of light field with smaller diameter lenslets. The array of lenslets, in both types, comprises a plurality of lenslet adjacent to each other, to cover a plane sufficient to capture the light incoming from the remaining optical elements. The lenslet array can be termed a context imager. The context imager forms a composite image with the light information collected by each lenslet in the array. The context imager allows demagnetification of a sample image, and a subsequent increase in depth of field.

Figure 8:
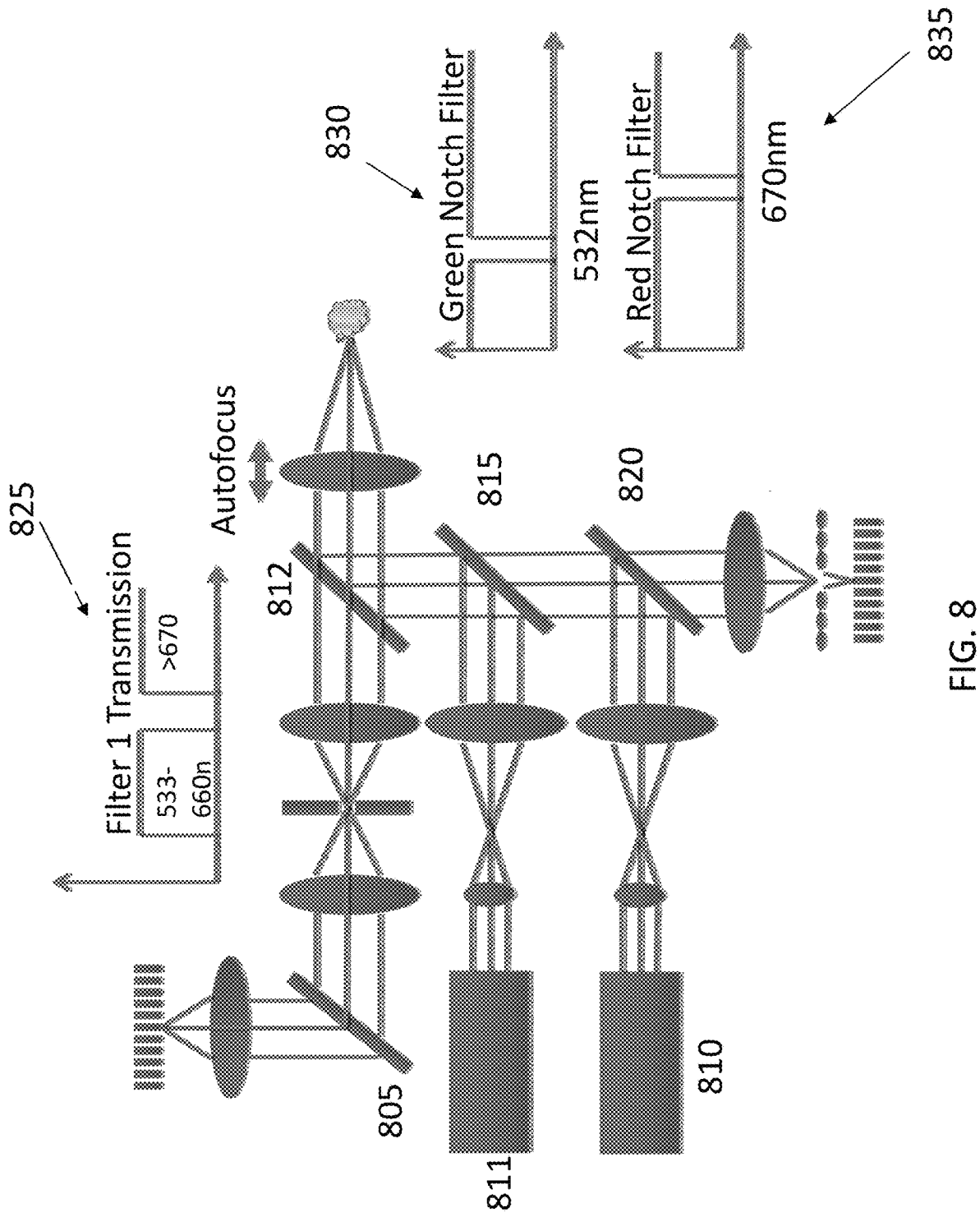
FIG. 8 illustrates an exemplary Raman and context imaging set up with two lasers.

FIG. 8 illustrates an embodiment alternative to that of FIG. 4. The optical elements of FIG. 8 are similar to those of FIG. 4 and their description is not repeated as it will be readily understood by the person of ordinary skill in the art. Differences comprise the use of an additional, second laser (810) for the implementation of SERDS. For example, laser (810) will be in red light, while the other laser (811) would be in green light. In some embodiments, one or both of the lasers can be modulated in wavelength as described above in the present disclosure, to allow multi-wavelength techniques more complex than the simple SERDS technique.

To collect Raman signals in this embodiment a triplexed holographic grating (805) can be used. The filters used in this embodiment comprise filters (812, 815, 820), whose transmission bands can be adjusted according to the wavelength of the excitation lasers. For example, for a green laser with a wavelength of 532 nm and a red laser with a wavelength of 670 nm, filter (812) can have the transmission band (825), which reflects both excitation wavelengths. Filter (815) can have the transmission band (830), which allows reflection of the green light, and filter (820) can have the transmission band (835), which allows reflection of the red light. In some applications, using only green light can be disadvantageous since the fluorescence signal may be very intense. In these cases, the use of a second laser, such as a red laser, may allow the removal of the fluorescence signal.

As known to the person of ordinary skill in the art, the Raman interaction leads to two possible outcomes: the material absorbs energy and the emitted photon has a lower energy than the absorbed photon (Stokes Raman scattering), or the material loses energy and the emitted photon has a higher energy than the absorbed photon (anti-Stokes Raman scattering). At low temperatures, Stokes scattering is predominant and may be at a wavelength of 535-675 nm with a 532 nm excitation wavelength.

As known to the person of ordinary skill in the art, geological samples are best analyzed using green excitation. However, due to high levels of laser induced fluorescence (LIF) often encountered using visible wavelength laser excitation, organic compounds are generally best identified using near-infrared Raman excitation. In some embodiments, a dual laser setup can be employed, for example with a green laser at 532 nm and a laser at 785 nm.

Since LIF and Raman spectra frequently occur together in mineral samples, shot noise associated with a strong LIF spectral background can overwhelm weaker Raman peaks. To deal with Raman-confounding LIF, a dual laser set up can employ two strategies: (1) use of a longer excitation wavelength laser (785 nm) whose photons often have insufficient energy to induce the electronic excitation necessary to produce LIF and (2) the use of lasers that can be step tuned (over 1-2 nm) about their nominal (532 nm or 785 nm) operating wavelengths.

Serially shifted excitation (SSE) of the laser wavelength produces corresponding wavelength shifts in the Raman spectra with respect to shift-invariant LIF spectra. The set of excitation wavelengths used, together with the sample spectra collected at each shift, may be expressed as a linear system of equations. These can be solved for the pure Raman and fluorescence components. Shot noise from LIF is mathematically removed from the Raman component and lumped with the LIF component.

Since the dual laser set up as described above in the present disclosure uses low power CW laser excitation, thermal heating effects are minimized over any Raman system using pulsed light to deliver the equivalent amount of energy to the sample over the same time period. Unlike Raman architectures using UV laser excitation, the dual laser set up uses visible and NIR excitation to provide photons with energies below the binding energies of most organic molecules thereby preventing sample degradation. Thus the dual laser set up represents a Raman instrument with broad utility that bridges the gap between instruments best suited for geologically or astrobiologically-based investigations. Each of the dual lasers may be step tuned to vary their wavelength and allow serially shifted excitation and correspondingly shifted Raman spectra.

As described above, if the excitation frequency of the laser is shifted slightly, the Raman active vibrational modes of the sample remain unchanged, so the absolute frequencies of the Raman scattered light will shift as well. The situation with fluorescence is markedly different. Fluorescence of a molecule with appreciable yield nearly always occurs at the lowest excited state. Consequently if the excitation wavelength changes slightly and the sample is fluorescing, the spectrum will essentially remain unchanged.

Serially shifted excitation (SSE) is derived from shifted excitation Raman difference spectroscopy (SERDS). SERDS simply involves subtracting an initial raw laser excitation spectra from another raw spectra acquired at a slightly shifted wavelength. The fluorescence from each acquisition subtract to zero, while a derivative-like Raman difference spectra is preserved. The Raman spectra can be recovered from the SERDS pseudo-derivative Raman spectrum though the use of curve fitting, Fourier deconvolution, or discrete integration. However curve-fitting is limited to simple spectra, deconvolution can amplify noise, and discrete integration can lead to a broadening of the Raman features and a sloping baseline. While SERDS can be employed in situations where fluorescence is not too severe, shot noise inherent in the fluorescence spectral component is equal to the square root of the number of photons collected within each of the spectrometer's spectral resolution bands. Therefore if a Raman peak of interest is smaller than the square root of the number of photons of the fluorescence spectrum in the corresponding spectral band, no meaningful recovery of the peak can be produced by employing SERDS.

The operating principals of SSE are based on observing changes that occur to the raw acquired spectra when the excitation frequency is increased incrementally by the same offset, in serial fashion. Mathematically the set of raw spectra acquired will contain sequentially shifted Raman components each summed with an un-shifted fluorescence spectral component.

Rather than using just two excitation frequencies like SERDS, the SSE methodology uses K excitation frequencies (K≥3) to collect and then process K raw spectra to "solve" for the individual LIF and Raman spectral components within the raw spectrum. Recognizing that the Raman components within the raw spectrum acquired will be shifted in frequency the same amount as the laser, and that the fluorescence components will all be shift invariant, allows the problem to be formulated in terms of the linear algebraic equation HS=R, where S is the solution vector containing the desired fluorescent and Raman components and R contains the set of acquired raw spectra collected at each of the K-1 shifts in laser excitation frequency, and H is an operator matrix. The elements of H consist of entirely zeros and ones in the form of partitioned square submatrices. The submatrices of H multiply the Raman and fluorescence solution vector elements such that they map and sum with the appropriate frequency shift in direct correspondence with those components contained (but hidden) inside the set of acquired raw spectra in R. An expectation-maximization solution can be found, as described by McCain at al. (cited above). SSE (unlike SERDS) always provides better signal to noise ratio when compared to conventional Raman for a given energy of exposure to the sample.

An improved algorithm is described by Cooper et al. Cooper J, et al., "Sequentially shifted Raman spectroscopy: Novel algorithm and instrumentation for fluorescence-free Raman spectroscopy in spectral space", Applied Spectroscopy 67 (8), pp. 973-984, 2013, the disclosure of which is incorporated herein by reference in its entirety. Cooper's optimized algorithm requires estimates of the Raman and fluorescence spectra to initialize the algorithm. The initial estimate of the Raman signature is obtained by taking the maximum of the SSE spectra collected since this enhances the peaks within the ensemble which are presumed to be Raman peaks for purposes of this initial guess. Similarly the initial estimate of the fluorescence signature is obtained by taking the minimum of the SSE spectra collected.

One large advantage of SSE over SERDS is in reduction/elimination of shot noise in the Raman component. Shot noise with SERDS actually increases by a factor of the square root of 2 over the raw signal. With SSE, shot noise does not shift as the laser frequency is changed, and therefore its contribution is mapped into the fluorescence component.

In some embodiments, a monolithic AlGaAs quantum well laser can be used for generating a tunable light source in the 785 nm regime. This laser can incorporate a monolithic distributed Bragg reflector into its structure in a hermetically sealed package. In some embodiments, the intracavity KTP crystal of the green laser described above provides a convenient tool for temperature tuning the laser based on the Lyot filter effect for implementing both SERDS and SSE methods.

Figure 9:
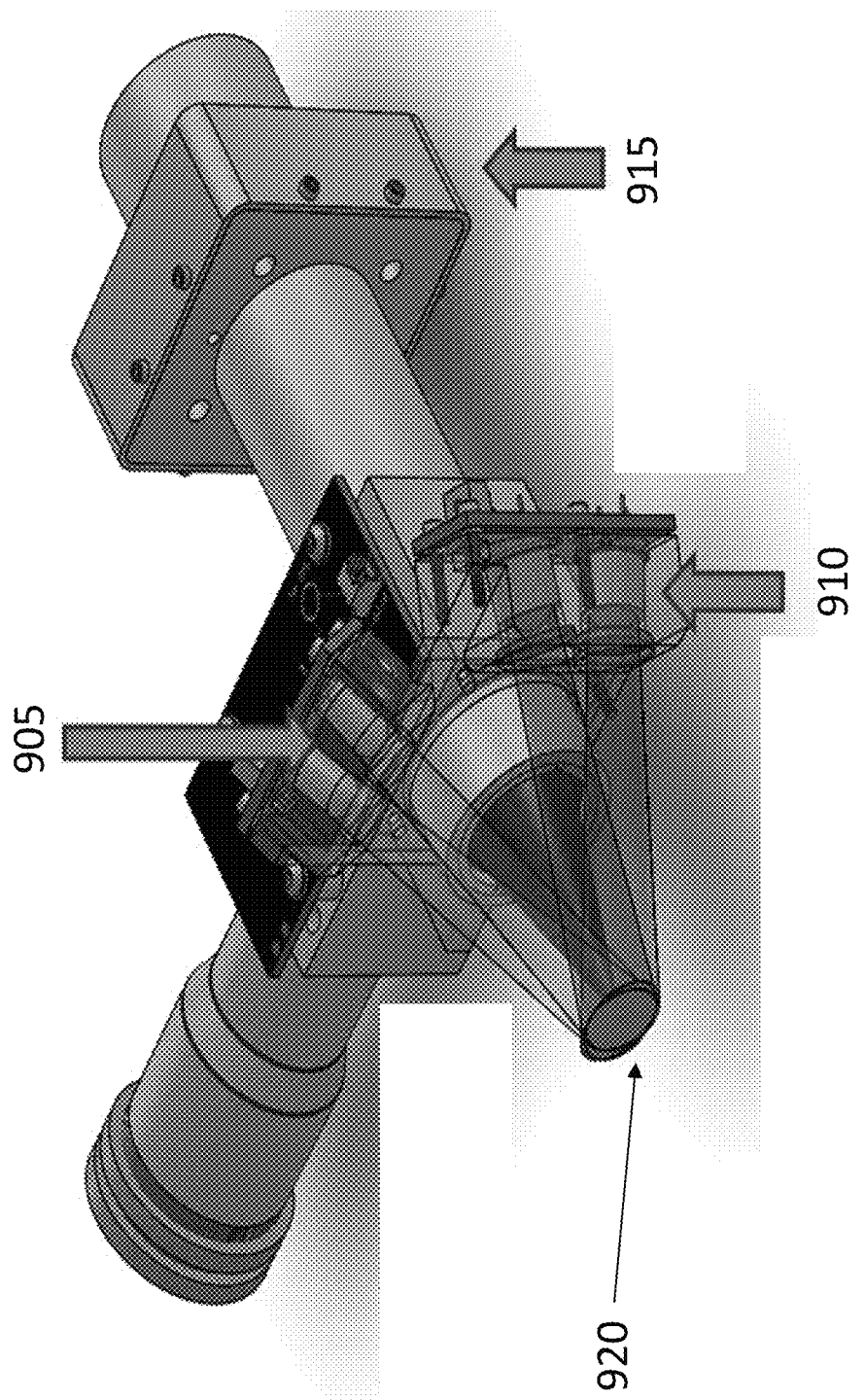
FIG. 9 illustrates an exemplary ring of LEDs.

FIG. 9 illustrates an exemplary LED ring as discussed above with reference to FIG. 4. In some embodiments, LEDs may have a wavelength of 470 nm (905) and comprise filters. This set up can allow Raman and context images to be collected at the same time. In some embodiments, additional LEDs may have a different wavelength, such as 275 nm (910)—these LEDs may also comprise filters. A slit holder (915) may also be part of the optical elements. In some embodiments, the slit holder may be positioned at the probe head site for a more robust performance. The sample position (920) is also illustrated. Other embodiments may comprise LEDs in a different number and position. In some embodiments, the dual length LED illumination system, comprising LEDs at two different wavelengths, may translate with the context imager and Raman fore optics.

In some embodiments, the green laser has a wavelength of 532 nm, and the second laser has a wavelength between 660 nm and 790 nm. In some embodiments, the LED light is smaller than 532 nm, for example between 450 and 250 nm.

The person of ordinary skill in the art will be familiar with the RUFF database, which contains Raman spectra, x-ray diffraction and chemistry data for minerals. The RRUFF database includes 7,000 spectra from 3,527 different species of the 4,967 known minerals. The Raman spectra within RRUFF are all collected using both 532 nm and 785 nm laser excitation. Of the mineral species catalogued, confounding fluorescence precludes spectral identification of approximately 533 of these species (16%) at one of these two excitation wavelengths. Half of these mineral species (~266, 8%) cannot be spectrally identified using either excitation wavelength due to confounding fluorescence, while 27 species (0.77%) are not Raman-active.

In the following, the present disclosure describes a dual wavelength Raman/fluorescence spectrometer (DWARF), an instrument designed to enable identification of the widest variety of planetary materials and organics using Raman spectroscopy while exploiting laser induced fluorescence (LIF) as a means of performing low level detection of organics and some trace minerals. Fluorescence cross-sections are frequently 4-6 orders of magnitude stronger than their corresponding Raman cross-sections but spectral features are frequently too broad for definitive identification. Conversely, while usually less intense, Raman spectra typically contain sharp peaks in the fingerprint region allowing them to be compared to a spectral library of minerals or chemicals for sample identification. While LIF spectra serve as a good fluorescent organic or mineral detection tool, the shot noise associated with the fluorescence baseline can obscure the Raman signature. To deal with this situation, DWARF uses 785 nm and 532 nm lasers that are each slightly tunable to incrementally shift the Raman peak positions in wavelength with respect to the wavelength invariant LIF spectra. DWARF employs a technique called serially shifted excitation (SSE) which uses a mathematical algorithm to acquire and then process a set of shifted excitation spectra to separate the fluorescence and Raman spectral components.

DWARF uses both 785 nm and 532 nm laser excitation wavelengths because 1) it has been shown that 91% of RRUFF minerals can be identified using 532/785 nm excitation and 2) many organic compounds significantly fluoresce under 532 nm laser excitation but do not under 785 nm excitation. Therefore, DWARF is the ideal tool for performing definitive mineralogy as well as organic detection. The person of ordinary skill in the art will understand that, in some embodiments, the two wavelengths of the dual laser setup may be modified to use different wavelength values.

The DWARF spectrometer is therefore capable of both low level organic detection and identification of a wide variety of planetary materials. DWARF combines dual wavelength laser excitation wavelengths and SSE to mitigate confounding fluorescence in performing spectral identification using Raman while retaining fluorescence signatures as a means for low level organic detection.

Figure 10:
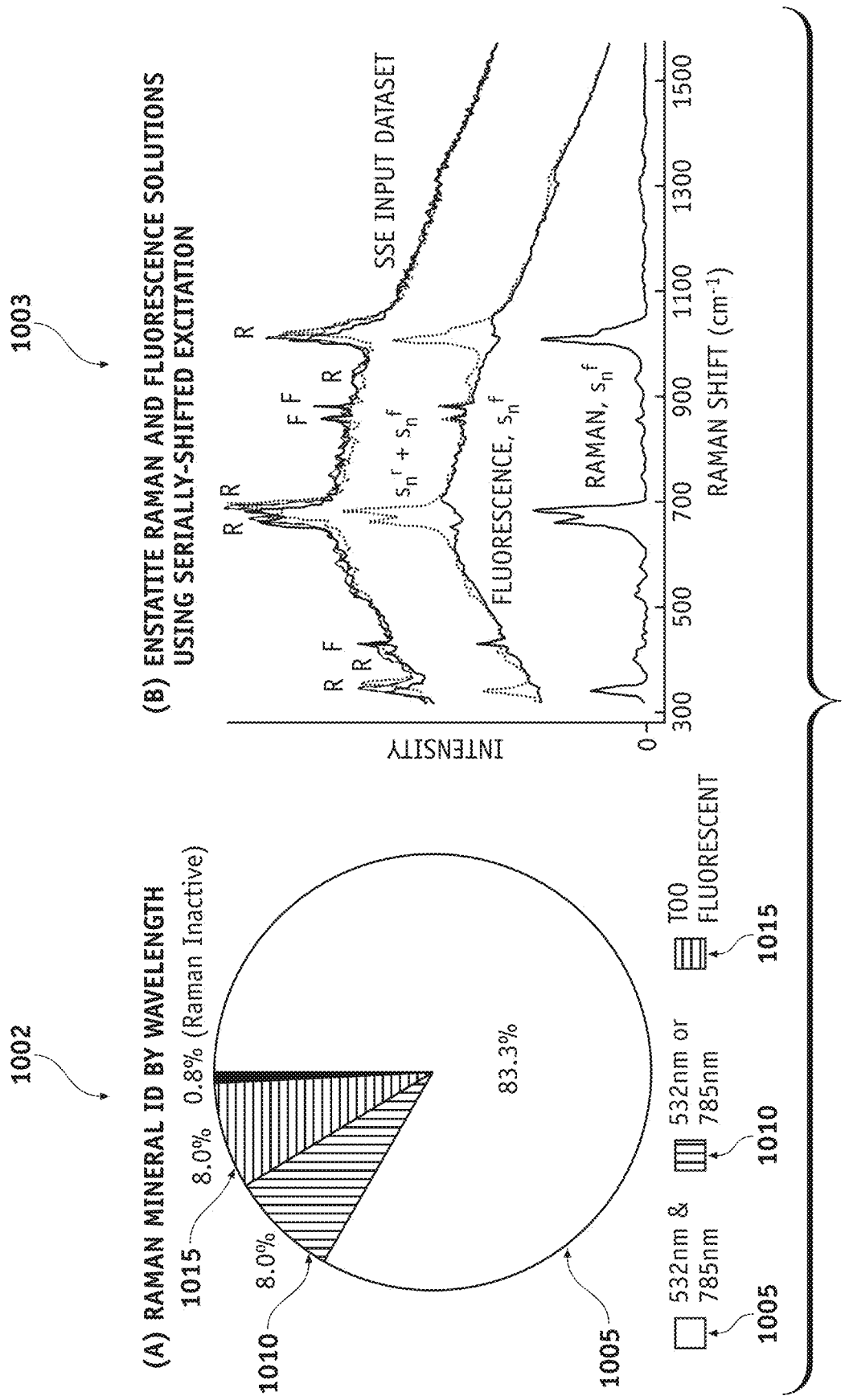
FIG. 10 illustrates the mineral identification capabilities of Raman instruments using 532 nm and/or 785 nm excitation.

FIG. 10 illustrates the mineral identification capabilities of Raman instruments using 532 nm and/or 785 nm excitation (1002); and the SSE baseline results (1003) using 785 nm laser excitation (11 spectra, 14.5 cm$^{-1}$ span) reveal narrow peaks within both the Raman (sn$^r$) and fluorescence (sn$^f$) components of the mineral enstatite.

The DWARF spectrometer uses continuous-wave (CW), rather than pulsed, laser excitation, thereby allowing the instrument to collect Raman and fluorescent spectral signatures with the least sample degradation possible and with a better spectral acquisition and wall-plug efficiency than other competing instrument platforms (such as UV Raman and pulsed laser instruments).

Applications that could benefit from DWARF's capabilities include: 1) surface exploration missions to terrestrial bodies (Moon, Mars, Venus, and Mercury), asteroids, comets, and the icy moons, 2) sample return missions needing characterization and sample selection capabilities and 3) mission exploration by astronauts (e.g. DWARF as a handheld chemical/geological identification tool). Furthermore, DWARF is applicable to all three categories of planetary missions (discovery, new frontiers, and flagship missions).

For example, the 2011 Decadal Survey (2013-2022) states that in situ Raman would enhance science return by providing definitive characterization of molecular species. Missions that would benefit included one flagship mission (Mars Sample Return) and three of seven high priority New Frontiers missions (Comet Surface Sample Return, Venus In Situ Explorer, South Pole-Aitken).

The DWARF spectrometer that draws from technologies described above in the present disclosure, which were used to develop the Mars Microbeam Raman Spectrometer (MMRS) and the Compact Integrated Raman Spectrometer (CIRS). Both instruments are imaging spectrographs using CW green wavelength excitation which provides the best overall quality of Raman signatures for most minerals. Furthermore, CW excitation provides the least likelihood of sample degradation for a given exposure.

MMRS was rated as a category 1 instrument for the Mars Science Lander (MSL) mission but was dropped from the payload due to concerns over routing optical fiber from its probe head to the spectrograph (housed in the rover body) through the rover arm and its various articulations. In response to this, under internal JPL and MatISSE funding, CIRS was developed, which directly couples the spectrograph to the probe head. CIRS was proposed for the Mars 2020 mission, but was not selected in favor of two other instruments, a deep UV Raman instrument called SHERLOC and a standoff pulsed green Raman subsystem incorporated an instrument called SuperCAM. CIRS was not selected for Mars 2020 because the mission was more focused on the search for organic compounds than definitive mineralogy and there were concerns within the review panel that Raman signatures could be overwhelmed by fluorescence from organic materials or fluorescent minerals such as phyllosilicates and clays. While it is unlikely that confounding fluorescence would be a problem on Mars, it could be a problem for venues such as Titan, Enceladus, and Europa where organics are more likely to be encountered and mineral/salt matrices may fluoresce due to radiation induced color centers.

In response to these potential problems, DWARF has been developed since this instrument provides a means for dealing with LIF by using dual wavelength excitation coupled with SSE. This approach retains CW laser excitation to avoid sample degradation while allowing the use of a classic instrument architecture that does not compromise instrument performance. DWARF, like MMRS and CIRS, provides high resolution (6-8 $cm^{-1}$) Raman capability and exceeds the full 150-3800 $cm^{-1}$ range of interest required for identifying both minerals and organic compounds.

SHERLOC and SuperCAM use spectral and temporal partitioning, respectively, to separate the Raman and fluorescence components from the raw signal collected. Because SHERLOC uses deep UV excitation at a wavelength of 248.6 nm, the resulting Raman fingerprint region is shifted to a wavelength range below 280 nm, where fluorescence does not normally occur. However, the desired Raman shifts (150-4000 $cm^{-1}$) correspond to a wavelength span of only 26 nm. This narrow span makes it very difficult to both resolve a large portion of the lower wavenumber finger print region and achieve the required spectral resolution (6-8 $cm^{-1}$) for definitive mineralogy. Consequentially SHERLOC begins coverage starting at 810 $cm^{-1}$ with a resolution of >50 $cm^{-1}$. As a consequence, SHERLOC does not have the capability to identify important minerals such as hematite, sulfides, pyroxene, magnetite, plagioclase feldspars, illmenite, and olivine. Additionally, many common surface minerals show nearly complete absorption over a wide variety of UV wavelengths. Sulfate peaks that are easily detected using 532 nm Raman (at 1112 $cm^{-1}$ and 1151 $cm^{-1}$) are undetectable when using UV Raman.

The above compromises were made for SHERLOC to exploit deep UV excitation's ability to induce resonantly enhanced Raman scattering in small polyaromatic hydrocarbons and aromatic amino acids as a means to detect these species at very low concentrations. However the 248.6 nm laser provides 4.98 eV of energy per photon exceeding the 3.6 eV bond dissociation energy of a carbon-carbon bond. This makes organic sample degradation unavoidable.

TABLE 1

| Parameter | DWARF | SHERLOC (Deep UV) | SuperCAM | Delta Nu |
|---|---|---|---|---|
| Laser Wavelength & Power) | 532, 5-50 mW (CW) 785 nm, 24-220 mW (CW) | 248.6 nm, 10 µJ | 532 nm, 2-18 mJ, 10 Hz | 1064 nm, 30-800 mW (CW) |
| Detector Technology | CCD, Cooled −10° C. | CCD, Cooled −10° C. | Intensified CCD, Gated <100 ns | InGaAs, Cooled <−65° C. |
| f/#/working dist./ spot size | f/2, 30 mm, 20 µm | f/7, 6.8 mm, 50 µm | f/13-f/109, 1.4-12 m, 0.9-7.8 mm | 100 µm |
| Sample Degradation Process | Thermal (1.6-70 $KW/cm^2$) | Photodegradation (5eV) | Thermal (0.8-7.5 $MW/cm^2$) | Thermal (0.4-10.2 $KW/cm^2$) |
| Fluorescence Mitigation | Wavelength Modulation | Spectral Partitioning | Temporal Gating (100 ns) | None (low energy/photon) |
| Raman Shift | 532 nm: 150-4000 $cm^{-1}$ 785 nm: 320-3150 $cm^{-1}$ | 810-4000 $cm^{-1}$ | 150-4000 $cm^{-1}$ | 200-2000 $cm^{-1}$ |
| Fluorescent Wavelength Range | 532-1100 nm | 270-400 nm | 532-700 nm | 1064-1650 nm (REE's) |
| Resolution | 6 $cm^{-1}$ | 50 $cm^{-1}$ | 7 $cm^{-1}$ | 15 $cm^{-1}$ |
| Resonantly Enhanced Species | carotenoids/chlorophyll | aromatic AA, PAH | carotenoids | none |
| Mineral Coverage | >92% of all minerals | Non UV absorbing, with peaks >810 $cm^{-1}$ | cross-sections ≥ olivine | large cross-sections |

SuperCAM, on the other hand, is a standoff Raman instrument that uses a pulsed, Q-switch laser to expose remote samples to 2-10 mJ pulses of green light, a few nanoseconds duration at 10 Hz, allowing it to survey 2-20 meters around the spacecraft. Time-gating the signal allows SuperCAM to discriminate between Raman scattering (a virtually instantaneous process) and florescence (delayed 100 ps-ms, depending on the sample). While SuperCAM is great at surveying the local area for scientific targets, its propensity to degrade the sample (due to high pulse energies) and its low sensitivity (due to f/13 collection and relatively inefficient CCD detector) stand as two fundamental challenges.

DWARF therefore fills a niche within the NASA's current planetary Raman instrument portfolio whose fundamental strength are for site survey and organic detection. Table 1 details a comparison of NASA Raman/fluorescence instruments with DWARF. DWARF complements these instruments with its comprehensive mineralogy and organic detection capabilities by providing the free spectral range and resolution that scientists need. DWARF can examine samples just 30 mm from its f/2 collection optics and minimizes the spot size on the sample (<30 µm) allowing it to target mineral grains while maximizing collection efficiency. Moreover, DWARF employs a technique (SSE) that allows separation of Raman and fluorescence components without sample degradation. This is done through the use of CW laser excitation (to minimize peak power), tunable laser powers (to avoid thermalizing the sample), and low photon energy excitation wavelengths (to prevent chemical changes to the sample).

Figure 11:
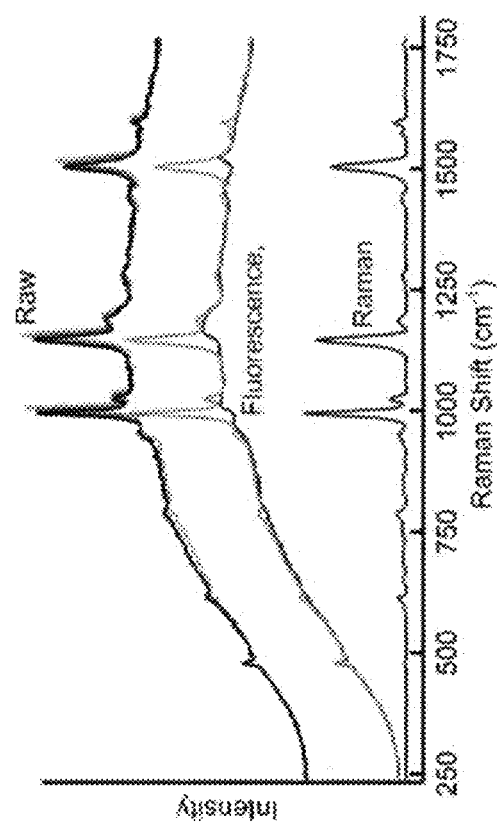
FIG. 11 illustrates the resonant enhanced carotenoid peaks of 532 nm SSE Raman spectrum of *Deinococcus radiodurans*.

FIG. 11 illustrates the resonant enhanced carotenoid peaks of 532 nm SSE Raman spectrum of *Deinococcus radiodurans*.

Although DWARF cannot induce resonant enhancement in small aromatics and PAH compounds like SHERLOC, the instrument compensates for this by using a low number of optics, low scatter/high efficiency holographic gratings, and a CCD detector that enjoys higher quantum efficiency across the wavelength range required. That being said, DWARF's excitation wavelengths strongly induce resonance enhancement of long conjugated or aromatic organics such as carotenoids and chlorophyll using 532 nm and 785 nm excitation. For example, FIG. 11 shows a Raman spectrum acquired using CIRS with 532 nm excitation of a culture of *Deinococcus radiodurans*, one of the most radiation resistant bacteria known. This spectrum reveals the presence of carotenoids. This organism synthesizes carotenoids to remove radiation-induced free-radicals. Therefore, DWARF's ability to induce resonance enhancement in these large conjugated organic molecules could be an important life detection strategy on Europa or Enceladus since the high radiation environment may have caused putative organisms to evolve so as to synthesize these anti-oxidants as a protection mechanism.

Geologic samples often have a low optical penetration depth and hence small Raman collection volumes. Since penetration depth is typically propotional to wavelength, geologists usually use 532 nm or 785 nm excitation. Furthermore, since interference from fluorescence is frequently not a serious issue, a strong benefit is gleaned from the increased scattering efficiency realized at 532 nm vs longer wavelengths. Additionally, the fact that the RRUFF database uses only 532 and 785 nm excitation demonstrates the value of these wavelengths. Also, the C—H and O—H (2800-3650 $cm^{-1}$) vibrational modes are Raman shifted into a wavelength regime that can be captured using a silicon charge-coupled device (CCD) and many low/non-fluorescing organic compounds (including reduced carbon) can be readily and efficiently identified. In a few cases, 532 nm excitation causes confounding fluorescence. These can be resolved by switching to the longer 785 nm excitation at increased power levels. Thus, the use of 532/785 nm for DWARF strikes a reasonable balance. The spectrometer is then capable of detecting and identifying both minerals and organics with sufficient signal-to-noise ratio (SNR) while avoiding confounding fluorescence.

A possible alternative is to use an even longer excitation wavelength, such as 1064 nm, particularly for Raman investigations in planetary exploration related to detection and identification of organic targets. However, there are a number of problems with developing an in situ 1064 nm Raman planetary science instrument. First, longer wavelengths require ever higher excitation powers. Second, a 1064 nm excitation requires the use of a detector with a smaller bandgap than a silicon CCD such as InGaAs, which can be engineered to provide a free spectral range covering 0.9-1.7 µm (4,135 $cm^{-1}$ for 1064 nm excitation). Thermally induced dark current in these systems is over 6 orders of magnitude higher than silicon CCD's. Unlike CCD's, which are shot-noise limited, InGaAs detectors are always detector-noise limited by dark current and read noise. Deep cooling of the InGaAs detectors to temperatures −65° C. or lower is required to limit dark current. Furthermore, since each pixel of the array or imager requires an amplifier, each pixel has a different gain and offset which must be compensated for. Third, if the sample temperature is 250° C. or above, it will emit sufficient blackbody radiation that can mask the Raman spectra. Sample heating can also be due to self-absorption of the 1064 nm laser radiation.

Raman investigations of fossils and stromatolites have reported favorable results conducted using Raman with 514 nm, 532 nm, and 785 nm excitation. In spite of the numerous advantages of a 532/785 nm Raman instrument, no commercial or planetary Raman instrument currently exists that provides the dual wavelength capability of DWARF. Some commercial instruments allow grating/filters to be swapped out for each excitation wavelength, but only DWARF provides an integrated dual-wavelength capability.

As known to the person of ordinary skill in the art, the 2013-2022 Decadal Survey identified three scientific themes for planetary exploration in the next decade. These are 1) Building new worlds—understanding solar system beginnings; 2) Planetary habitats—searching for the requirements for life; 3) Workings of Solar Systems—revealing planetary processes through time. The surface exploration and sample return missions identified by the Decadal Survey demonstrate the community-wide recognition of the science value of these exploration missions. The success of such missions relies strongly on discovering the compositional and molecular make-up of the planetary surface and subsurface materials, which forms an essential basis to understand the physical and chemical processes that they have experienced over time. These processes in turn link directly to the three Scientific Themes stated in the Decadal Survey. DWARF enables these over-arching goals.

Therefore, the present disclosure describes a spectrometer which can: Demonstrate comprehensive mineral identification capable of identifying >92% of minerals by employing dual wavelength 532/785 nm excitation and SSE; Demonstrate Raman detection limits of reduced carbon <10-3 wt/wt (per point sampled); Demonstrate LIF detection limits of <1 ppm of relevant organic molecules listed in the Europa Lander report; Instrument Power <10 W, Mass<5.3 kg, Volume<5700 $cm^3$. These capabilities flow both from the discussion of the RUFF mineral database and the stated science requirements within the Europa lander report for the Vibrational spectrometer.

DWARF is a Raman/fluorescence instrument that mitigates thermal and photonic sample degradation processes though the use of continuous wave (CW) visible and near-infrared laser excitation while providing capabilities of definitive mineralogy and life detection even in the presence of confounding fluorescence. Since DWARF can separate the fluorescence and Raman signatures, LIF can be used as a low-level detection method for putative organics, while the Raman functionality can be used for identification. Two types of missions will specifically benefit from this development: 1) surface exploration missions to terrestrial planets, asteroids, comets, icy moons, the satellites of the gas giants for in situ definitive identification and characterization of molecular species in planetary materials including organic compounds; 2) sample return missions for selection and characterization of the planetary materials to be returned.

Laser induced fluorescence (LIF) spectroscopy and Raman spectroscopy (RS) are powerful tools for planetary science because they reveal information about a compound's electronic and molecular structure. However, the acquired spectra may contain LIF components that obscure weaker Raman spectral components. Today's planetary Raman instruments employ methods to mitigate LIF that, by their very nature, either compromise overall system performance and/or subject the sample to laser fluencies that may significantly degrade the sample.

The DWARF instrument enables acquisition of high SNR Raman signatures from both minerals and organics by removing fluorescent background. This feature makes DWARF ideal for use in astrobiology-centric investigations or where high levels of mineral fluorescence are anticipated. In some embodiments, the instrument platform is small (170 mm×140 mm×60 mm) making it suitable for inclusion on small-, mid-, and large-sized rovers and landers.

DWARF is a dual excitation wavelength instrument and it employs a two-step approach to provide pristine Raman and Fluorescence spectra at those wavelengths. Step 1 is to collect spectra at both excitation wavelength regimes. Raman spectra are often of higher quality for most minerals if taken using 532 nm excitation vs 785 nm excitation since near infrared (NIR) is strongly absorbed in dark materials and the Raman scattering efficiency (785 nm/532 nm)$^4$=4.74 times stronger using green excitation. The laser power ranges for DWARF for 532 nm and 785 nm as shown in Table 1 are scaled accordingly with respect to one another and are typical of the state-of-the-practice power ranges used for mineral and organic analysis of commercial and planetary Raman instruments being developed. The spectral resolution of DWARF is 8 cm$^{-1}$ as this has been shown to be the minimum necessary for characterization of most minerals with 16 cm$^{-1}$ being required for organic compounds.

However, LIF fluorescence from putative organics is also much stronger at 532 nm than at 785 nm. At 532 nm excitation LIF provides a more sensitive detection capability for organic compounds whose LIF spectra may confound their weaker Raman signatures, as well as the Raman signature of the rock, regolith, or ice matrix in which such organic compounds may be found. By applying a 785 nm wavelength excitation next, less fluorescence in both minerals and organics is produced (except minerals containing rare earth elements); therefore, a better Raman identification capability for organics is realized.

Step 2 of the process is to use SSE if the confounding fluorescence is an issue, with a post-processing method that will be describe in the following, to analyze the raw spectra that was collected allowing a complete mathematical separation of the LIF and Raman spectra collected at both wavelengths. This feature is important since organic fluorescence, organic mineral fluorescence, as well as fluorescence from rare earth elements and transition metals (from a 785 nm excitation) can interfere with the Raman signatures. This approach insures the use of the superior detection capability of LIF and the identification and characterization capability of Raman, while mitigating sample degradation through the use of CW visible and NIR wavelength excitation light.

Figure 12:
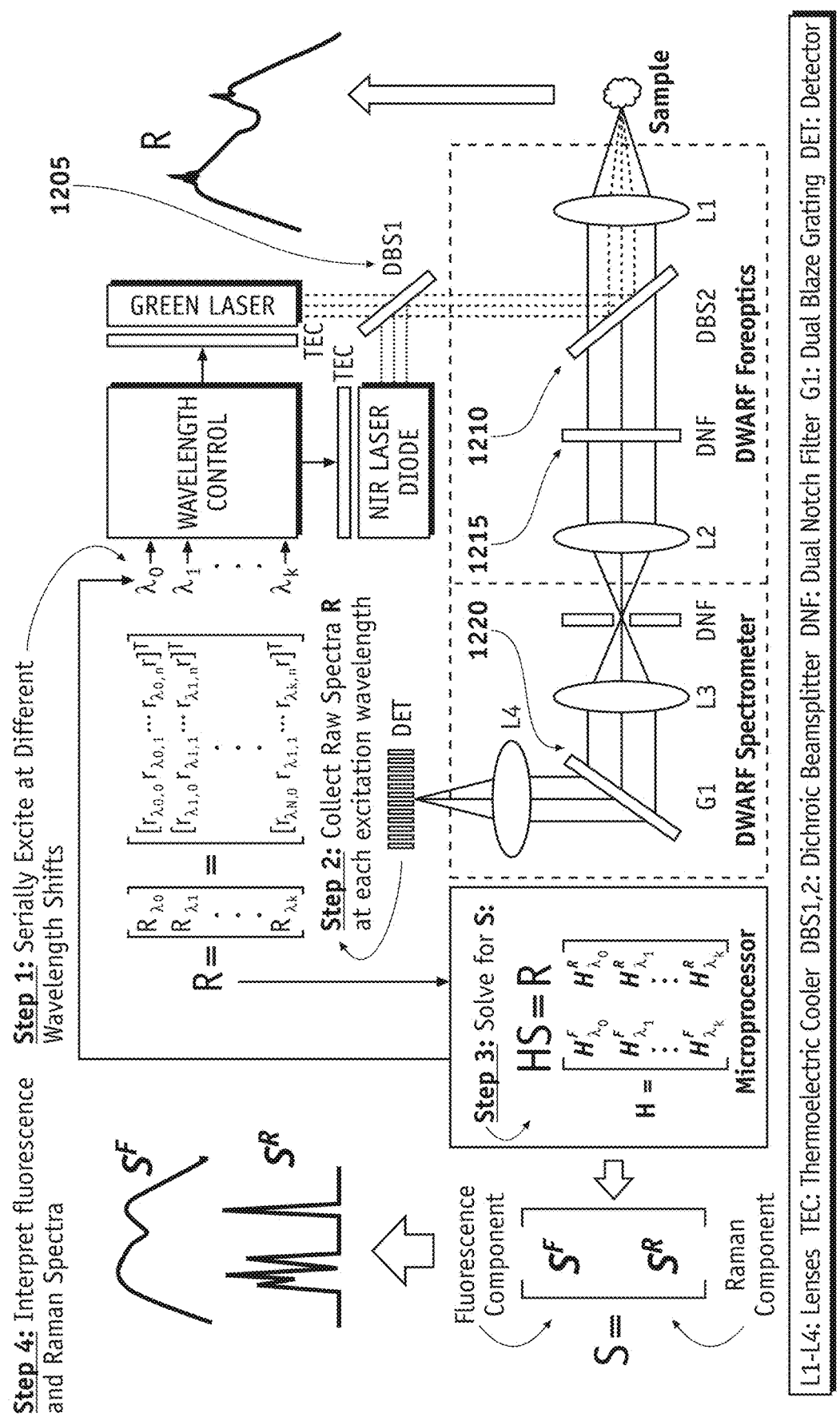
FIG. 12 illustrates how DWARF's dual wavelength excitation enables identification of most materials via their Raman spectra, SSE to separate Raman from confounding fluorescence, and CW excitation to minimize sample degradation.

FIG. 12 illustrates how DWARF's dual wavelength excitation enables identification of most materials via their Raman spectra, SSE to separate Raman from confounding fluorescence, and CW excitation to minimize sample degradation. FIG. 12 illustrates DWARF's optical design, which uses a directly couples f/2 collection optics to the spectrometer in a manner architecturally similar to the Compact Integrated Raman Spectrometer (CIRS) architectures previously developed under another NASA program with the major differences being the dual-band dichroic DBS1 (1205) and DBS2 (1210); notch filters DNF (1215), and a dual-band holographic grating G1 (1220). The dual-band grating can be implemented by cementing two holographic gratings sandwiched together with a slight twist angle with respect to one another. This produces two horizontal dispersion stripes across the detector. One of the gratings in the sandwiched pair is designed to disperse light across 150-4000 cm$^{-1}$ when the 532 nm laser excitation is used, while the second grating disperses light across 320-3150 cm$^{-1}$ when the 785 nm laser excitation is used.

In order to cover the entire free spectral range for each band in two dispersion stripes, a 2048×256 pixel detector can be utilized. This non-etaloning deep-depletion CCD was selected since it is a low noise device with a quantum efficiency of >85% across the entire free spectral range of the DWARF instrument.

As known to the person of ordinary skill in the art, there is a variety of computation methods that have been developed to suppress fluorescence. Among the methods employed, baseline estimation using wavelets, principal component analysis, or curve fitting using genetic algorithms and cubic splines can be used to provide an estimate of the fluorescence baseline. However, unlike other all other computational methods for fluorescence suppression, SSE leverages on changing a physical parameter (laser frequency) that allows discrimination of the Raman component from the fluorescence component and its shot noise. As discussed above, a physical change to the system is needed for discrimination when Raman signals are buried in shot noise. Other computation methods merely look to intelligently estimate the fluorescence baseline so that it can be subtracted off. Assuming a perfect estimated baseline, SSE still provides superior performance since these other computational methods cannot remove shot-noise from the raw spectra acquired. If shot noise buries the Raman signature, no amount of processing can recover it without employing a physical discriminator first.

If the laser excitation frequency of the laser is shifted slightly, the Raman active vibrational modes of the sample remain unchanged, so the absolute frequencies of the Raman scattered light will shift as well. The situation with fluorescence is markedly different. Fluorescence of a molecule with appreciable yield nearly always occurs at the lowest excited state (Kasha's rule). Consequently, if the excitation wavelength changes slightly and the sample is fluorescing, the fluorescence spectrum will essentially remain unchanged.

SSE evolved from a classic method of fluorescent mitigation called shifted excitation Raman difference spectroscopy (SERDS). Proposed in the 1990's, SERDS simply involves subtracting Raman spectra from an initial and slightly shifted excitation wavelength. According to Kasha's rule, fluorescence from each acquisition should subtract to zero, while a derivative-like Raman difference spectrum is preserved. However, shot noise inherent in the fluorescence spectral component is equal to the square root of the number of photons collected within each spectral band. Therefore if a Raman peak intensity is less that the shot noise inherent in a large fluorescence baseline, no meaningful recovery of the Raman peak is possible using SERDS.

Rather than using just two excitation frequencies like SERDS, the SSE methodology uses k excitation frequencies (k≥3) to collect and then process k raw spectra $R_{\lambda 0}$, $R_{\lambda 1}$, ..., $R_{\lambda k}$ to mathematically solve for the fluorescence and Raman spectral components $S^F$ and $S^R$ contained within the raw spectrum. Since it is unlikely that the shot noise associated with fluorescence would coincidentally shift with the Raman signature, the fluorescence shot noise is preferentially found in the fluorescence solution $S^F$ the more excitation shifts that are used during acquisition. Ambient light, like fluorescence, will not shift as the laser frequency is shifted, so interference from ambient light can be removed so long at its intensity and spectral characteristic remain unchanged during acquisition. SSE removes detector fixed pattern noise in a similar manner.

The Raman components within the raw spectrum acquired will be shifted in frequency by the same amount as the laser, and the fluorescence components will all be shift invariant. As a consequence, the physical problem can be formulated in terms of the linear algebraic equation HS=R, where S=$[S^F\ S^R]^T$ is the solution vector containing the desired fluorescent and Raman components, and R=$[R_{\lambda 0}, R_{\lambda 1}, \ldots, R_{\lambda k}]^T$ contains the set of acquired raw spectra collected at each of the k-1 shifts in laser excitation frequency, and H is an operator matrix. The elements of H consist of entirely zeros and ones in the form of partitioned square submatrices that appropriately align and shift the fluorescence and Raman solutions sought. Since H is a sparse, noninvertible matrix, HS=R cannot be solved by conventional means. However, an expectation-maximization (EM) solution can be iteratively solved, as described in McClain et al., "Multi-excitation Raman spectroscopy technique for fluorescence rejection," *Opt. Express*, vol. 16, pp. 10975-10991, 2008, the disclosure of which is incorporated herein by reference in its entirety.

Figure 13:
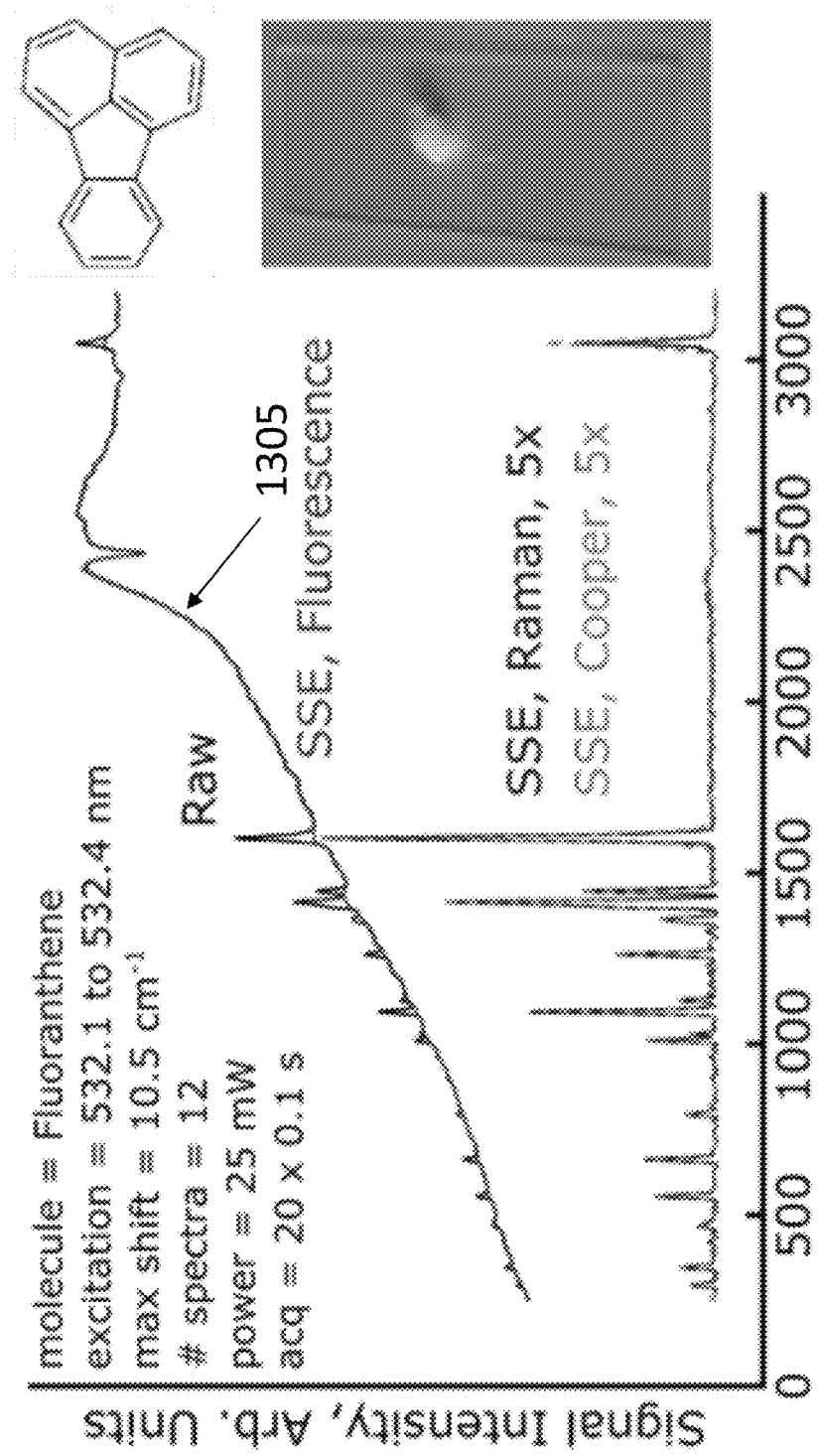
FIG. 13 illustrates the 532 nm SSE Raman data and compares the implementation the SSE algorithm (in Matlab™) vs his implementation in Labview™ for the highly fluorescent PAH fluoranthene.

It is also possible to show that SNR improves with SSE as the number of laser frequencies is increased even when the total energy delivered to the sample is kept constant. Thus, for a given energy of exposure, SSE always provides better SNR than conventional Raman with the same instrument. Therefore, SSE can be used to show excellent recovery of Raman spectra with highly fluorescent organic compounds including diesel fuel, acenaphthylene, dimethyl glyoxime, acenaphthylene, 4-bromo-N, N-limethyl-aniline, tris(hytroxymethyl)aminoethane, ceric(IV)ammonium sulfate, acetaminophen, grape seed oil, olive oil, and engine oils with high degrees of LIF using SSE with 785 nm excitation. Additionally, SSE can quantify the concentration of binary mixtures of toluene and acetonitrile with a correlation coefficient r2≥0.9 in the presence of a highly fluorescent dye when the weakest Raman peaks had an SNR≥0.1. This SSE methodology can be incorporate into both 785 nm and 532 nm Raman testbeds with tunable lasers to fully explore the power of this new technique. FIG. 13 illustrates the 532 nm SSE Raman data and compares the implementation the SSE algorithm (in Matlab™) vs his implementation in Labview™ for the highly fluorescent PAH fluoranthene.

Intracavity doubled diode pumped solid state (DPSS) lasers have been found to be an ideal source of green (532 nm) laser light for small Raman systems being developed for planetary applications. The birefringent doubling crystal within a DPSS laser can also be used as a tuning element (i.e. a first-order Lyot filter). The laser incorporates a potassium titanyl phosphate (KTP) crystal mounted inside the cavity for frequency doubling the output frequency. The Lyot filter implemented by KTP produces sinusoidal transmission function inside the laser cavity. The indices of refraction of the KTP are temperature dependent, therefore the phase of the sinusoid may be changed allowing the laser to be temperature tuned by sweeping it across the vanadate host's crystal's gain curve. The frequency of both the lasers used in DWARF have a narrow line width (0.1 nm), so as to avoid broadening the Raman or Fluorescence peaks observed.

A monolithic AlGaAs quantum well laser can be used for generating a single-frequency tunable light source in the 785 nm regime. This laser is unique in that it incorporates a monolithic distributed Bragg reflector into its structure in a hermetically sealed package. A thermoelectric cooler and thermistor inside the laser package can be used to control the temperature (0.58 nm/° C.) across a 50 $cm^{-1}$ range. One of the requirements of the SSE algorithm is that the spectrometer resolution is less than this tuning range, so the 8 $cm^{-1}$ spectrometer resolution specification satisfies this requirement.

An f/1.8 Raman spectrometer with a dual blaze holographic grating, a 532 nm notch filter, a 50 micron wide slit, and a camera were used in the baseline experiments. The camera contains an integrated four stage TEC cooler which was used to maintain the temperature of the CCD at −70° C. during acquisition. The excitation laser was fiber-coupled to a probehead which was mounted in an optical microscope with a 10× (NA=0.22) objective. The sample used for the baseline study illustrated in FIG. 13 was fluoranthene ($Cl_6H_{10}$), a highly fluorescent PAH identified within carbonaceous chondrites. Each spectrum was acquired with an integration time of 2 s with 25 mW of incident laser power at each of the laser excitation frequencies.

The line (1305) in FIG. 13 shows the raw spectra of fluoranthene prior to SSE processing. Fluoranthene is visibly fluorescent under UV excitation from a blacklight. To minimize the effects of photobleaching across the set of stepped exposures, from prior exposures standard normal variance (SNV) normalization was applied prior to SSE processing. The SSE Raman solution vector was obtained by iteratively processing a set of raw spectra acquired at 12 different excitation frequencies to obtain the SSE Raman solution vector.

DWARF can be applicable to planetary protection category IV-B missions. To this effect, it is possible to incorporate materials throughout the instrument design that can survive dry heat microbial reduction (e.g. thermal bake out at 125° C. for >100 hours). Additionally, during future maturation of phases, the instrument can be hermetically sealed and can incorporate a HEPA filter for use during bake out to facilitate pressure equalization. In some embodiments, a laser used in the spectrometer is tunable over a 50 $cm^{-1}$ range in the 785 nm regime by adjusting the operating temperature over a 50° C. span.

In some embodiments, different ways of tuning a laser can be employed, to carry out SSE as described above in the present disclosure. For example, an optically pumped semiconductor laser which is small, stable, and low cost may have a short cavity that only lases at a single frequency. In such cases, the laser can be tuned by thermally changing its cavity length, or by some other means such as a piezo-actuated grating or mirror. In other embodiments, a direct diode green laser may be too spectrally wide to be used for Raman spectroscopy. However, the laser can be placed in an external cavity, and can be spectrally narrowed and tuned by means of the tunable laser cavity. In some embodiments, these methods of tuning lasers can be used for the green laser portion of the Raman fluorescence mitigation system described in the present disclosure, using serially shifted excitation. An example of such laser is described in Components and Packaging for Laser Systems III, edited by Alexei L. Glebov, Paul O. Leisher, Proc. of SPIE, Vol. 10085, 1008505•(2017), the disclosure of which is incorporated herein by reference in its entirety.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A device comprising:
    a first laser to emit a first laser light at a first wavelength, the first laser being a frequency doubling green laser;
    a plurality of LEDs to emit LED light at a second wavelength different from the first wavelength;
    a second laser to emit a second laser light at a third wavelength different from the first and second wavelengths, the second laser being a red laser;
    a plurality of optical elements, comprising first, second and third dichroic beam splitters, to:
    convey the first laser light from the first laser onto a sample, convey the second laser light from the second laser onto the sample, and collect a Raman shifted light and the LED light from the sample;
    a Raman detector to collect the Raman shifted light; and
    a context imager detector to collect the LED light that is reflected from the second dichroic beam splitter and transmitted through the first and the third beam splitters,
    wherein
        the first dichroic beam splitter is configured to reflect the first laser light,
        the second dichroic beam splitter is configured to transmit the Raman shifted light, and
        the third dichroic beam splitter is configured to reflect the second laser light.

2. The device of claim 1, wherein the first wavelength is 532 nm, the second wavelength is between 450 and 250 nm, and the third wavelength is between 660 nm and 790 nm.

3. The device of claim 1, wherein the first wavelength is 532 nm, the second wavelength is between 450 and 250 nm, and the third wavelength is 785 nm.

4. The device of claim 3, wherein the first laser is configured to be step tuned over 2 nm about 532 nm, and the second laser is configured to be step tuned over 2 nm about 785 nm.

5. The device of claim 1, wherein the frequency doubling green laser comprises a birefringent crystal to modulate the first wavelength.

6. The device of claim 5, wherein the birefringent crystal is a Lyot filter.

7. The device of claim 6, further comprising a heater to control a temperature of the Lyot filter, thus modulating the wavelength of the first laser.

8. The device of claim 1, wherein:
    the first laser has a first operating wavelength,
    the second laser has a second operating wavelength,
    the first laser is configured to modulate the first operating wavelength, and
    the second laser is configured to modulate the second operating wavelength.

9. The device of claim 8, wherein a modulation range of the first operating wavelength and of the second operating wavelength is 2 nm.

10. The device of claim 1, wherein the plurality of optical elements comprises:
    first, second, third, fourth, fifth, sixth, seventh, eighth, and ninth lenses;
    first, second, and third dichroic beam splitters;
    a multiplexed holographic grating;
    a split; and
    a lenslet array,
    wherein:
        the first and second lenses are to transmit the first laser light from the first laser to the first dichroic beam splitter,
        the eighth and ninth lenses are to transmit the second laser light from the second laser to the third dichroic beam splitter,
        the first dichroic beam splitter is to reflect the first laser light to a second dichroic beam splitter and transmit the LED light from the second dichroic beam splitter to the seventh lens,
        the third dichroic beam splitter is to reflect the second laser light to the second dichroic beam splitter and transmit the LED light from the second dichroic beam splitter to the seventh lens,
        the second dichroic beam splitter is to reflect the first laser light from the first dichroic beam splitter to the third lens, reflect the second laser light from the third dichroic beam splitter to the third lens, and transmit the Raman shifted light from the third lens to the fourth lens,
        the third lens is to focus the first laser light and the second laser light from the second dichroic beam splitter to the sample and collect the Raman shifted light from the sample,
        the fourth lens is to transmit light through the split to the fifth lens,
        the multiplexed holographic grating is to refract the Raman shifted light from the fifth lens to the sixth lens,
        the sixth lens is to focus the Raman shifted light onto the Raman detector, the seventh lens is to focus the LED light onto the lenslet array, and the lenslet array is to focus the LED light onto the context imager detector.

11. The device of claim 10, wherein the lenslet array comprises lenslets having a diameter between 20 and 40 micrometers.

12. The device of claim 10, wherein the lenslet array comprises lenslets having a diameter between 240 and 260 micrometers.

13. The device of claim 10, wherein the Raman detector is a charged coupled device.

14. The device of claim 10, wherein at least one of the first, second, third, fourth, fifth, sixth and seventh lenses comprises a plurality of composite lenses.

15. A method comprising:
emitting a first laser light at a first wavelength by a first laser, the first laser being a frequency doubling green laser;
emitting LED light at a second wavelength different from the first wavelength by a plurality of LEDs;
emitting, by a second laser, a second laser light at a third wavelength different from the first and second wavelengths, the second laser being a red laser;
by a plurality of optical elements, comprising first, second and third dichroic beam splitters, conveying the first laser light from the first laser and the second laser light from the second laser onto a sample, and collecting a Raman shifted light and the LED light from the sample;
detecting the Raman shifted light by a Raman detector; and
detecting the LED light by a context imager detector, the LED light reflected from the second dichroic beam splitter and transmitted through the first and the third beam splitters,
wherein
the first dichroic beam splitter is configured to reflect the first laser light,
the second dichroic beam splitter is configured to transmit the Raman shifted light, and
the third dichroic beam splitter is configured to reflect the second laser light.

16. The method of claim 15, further comprising:
sweeping the first wavelength through a wavelength range in a plurality of first wavelength steps, by modulating a birefringent crystal in the first laser;
detecting the Raman shifted light at each wavelength step;
deriving a Raman spectrum for the sample from the detected Raman shifted light at each wavelength step;
sweeping the third wavelength through a wavelength range in a plurality of third wavelength steps, by modulating a birefringent crystal in the second laser;
detecting the Raman shifted light at each third wavelength step; and
deriving a Raman spectrum for the sample from the detected Raman shifted light at each first and third wavelength step,
wherein the first wavelength is 532 nm, the second wavelength is between 450 and 250 nm, and the third wavelength is between 660 nm and 790 nm.

17. The method of claim 16, wherein detecting the Raman shifted light comprises taking a difference between a Raman spectrum detected while emitting the first laser light and a Raman spectrum detected while emitting the second laser light.

18. The method of claim 16, wherein the plurality of optical elements comprises a lenslet array, and further comprising capturing a subset of the LED light from the sample with each lenslet of the array.

19. The method of claim 18, further comprising focusing an image of the sample at a desired point of the sample by processing the LED light captured by the lenslet array.

20. A device comprising:
a first laser to emit a first laser light at a first wavelength, the first laser being a frequency doubling green laser;
a plurality of LEDs to emit LED light at a second wavelength different from the first wavelength;
a second laser to emit a second laser light at a third wavelength different from the first and second wavelengths, the second laser being a red laser;
a plurality of optical elements, comprising first, second and third dichroic beam splitters, to:
convey the first laser light from the first laser onto a sample,
convey the second laser light from the second laser onto the sample, and
collect a Raman shifted light and the LED light from the sample;
a Raman detector to collect the Raman shifted light; and
a context imager detector to collect the LED light that is reflected from the second dichroic beam splitter and transmitted through the first and the third beam splitters.

* * * * *